(12) United States Patent
Biswas et al.

(10) Patent No.: US 12,160,449 B2
(45) Date of Patent: *Dec. 3, 2024

(54) AUTONOMOUS MONITORING OF APPLICATIONS IN A CLOUD ENVIRONMENT

(71) Applicant: Oracle International Corporation, Redwood Shores, CA (US)

(72) Inventors: Kamalendu Biswas, San Ramon, CA (US); Swati Satish Rao, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 17/675,781

(22) Filed: Feb. 18, 2022

(65) Prior Publication Data
US 2022/0174097 A1    Jun. 2, 2022

Related U.S. Application Data

(63) Continuation of application No. 16/657,545, filed on Oct. 18, 2019, now Pat. No. 11,258,827.

(30) Foreign Application Priority Data

Oct. 19, 2018   (IN) ............................. 201841039632

(51) Int. Cl.
*H04L 43/045*    (2022.01)
*H04L 9/40*      (2022.01)
(Continued)

(52) U.S. Cl.
CPC ............ *H04L 63/20* (2013.01); *H04L 43/045* (2013.01); *H04L 63/1408* (2013.01); *H04L 67/10* (2013.01); *H04L 67/535* (2022.05)

(58) Field of Classification Search
CPC ... H04L 63/20; H04L 63/1408; H04L 43/045; H04L 67/22; H04L 67/10; H04L 63/1425;
(Continued)

(56) References Cited

U.S. PATENT DOCUMENTS

| 7,089,428 B2 | 8/2006 | Farley et al. |
| 9,253,213 B2 | 2/2016 | Rodniansky |

(Continued)

FOREIGN PATENT DOCUMENTS

WO     2018236915     12/2018

OTHER PUBLICATIONS

IBM Cloud Activity Tracker, *IBM, las* updated Nov. 6, 2018, 10 pages, Available Online at: https://console.bluemix.neUdocs/services/cloud-activity-tracker/index.html#getting-started-with-cla, retrieved Oct. 28, 2019.

(Continued)

*Primary Examiner* — Aftab N. Khan
(74) *Attorney, Agent, or Firm* — Kilpatrick Townsend & Stockton LLP

(57) ABSTRACT

Provided are systems and methods for analyzing actions performed by users in using a cloud service, and adjusting the configuration of a security management and control system based on the analysis. In various examples, the analysis can include generating a weighted directed graph that reflects a user's use of the cloud service, and/or reflects the tenant's overall use of the cloud service. When the security monitoring and control system generates security alerts, the actions that resulted in the alerts can be compared to the graph to determine whether the actions are in accordance with prior behavior of the users. When the actions do correspond to the graph, the system can recommend that the security control or security policy that triggered the alert be modified. In various examples, the graphs can also be used (Continued)

to determine whether any user's actions are anomalous as compared to earlier behavior.

20 Claims, 10 Drawing Sheets

(51) Int. Cl.
*H04L 67/10* (2022.01)
*H04L 67/50* (2022.01)

(58) Field of Classification Search
CPC ............... H04L 63/102; H04L 41/0806; H04L 41/5096; H04L 43/0817
See application file for complete search history.

(56) References Cited

U.S. PATENT DOCUMENTS

| | | | |
|---|---|---|---|
| 9,471,775 B1 | 10/2016 | Wagner et al. | |
| 9,832,205 B2 | 11/2017 | Santhi et al. | |
| 9,900,332 B2 | 2/2018 | Muddu et al. | |
| 9,916,554 B2 | 3/2018 | Curcic et al. | |
| 10,063,654 B2 | 8/2018 | Kirti et al. | |
| 10,095,878 B2 * | 10/2018 | Goldfarb | H04L 63/105 |
| 10,152,232 B1 * | 12/2018 | Kleiner | G06F 11/3409 |
| 10,397,236 B1 * | 8/2019 | Chadha | G06F 11/3476 |
| 10,623,281 B1 * | 4/2020 | Zhao | H04L 43/0805 |
| 2013/0298184 A1 * | 11/2013 | Ermagan | G06F 21/54 |
| | | | 726/1 |
| 2017/0155672 A1 * | 6/2017 | Muthukrishnan | H04L 67/02 |
| 2017/0222873 A1 * | 8/2017 | Lee | H04L 41/12 |
| 2018/0375886 A1 * | 12/2018 | Kirti | H04W 12/086 |
| 2019/0052549 A1 * | 2/2019 | Duggal | G06Q 30/0635 |
| 2020/0034266 A1 * | 1/2020 | Kleiner | G06F 11/3034 |
| 2024/0073653 A1 * | 2/2024 | Johnson | H04W 4/16 |

OTHER PUBLICATIONS

Log Data—an Overview, *ScienceDirect Topics*, 2013, 18 pages, Available Online at: https://www.sciencedirect.com/topics/computer-science/log-data.

Guzzo et al., Malevolent Activity Detection with Hypergraph-Based Models, *IEEE Transactions on Knowledge and Data Engineering*, vol. 29, No. 5, May 2017, pp. 1-14, Online at: https://www.researchgate.net/publication/312932419_Malevolent_Activity_Detection_with_Hypergraph-Based Models.

Khalil et al., Cloud Computing Security: A Survey, Computers, vol. 3, No. 1, Mar. 2014, pp. 1-35, Available Online at: https://www.researchgate.net/publication/269516029_Cloud_Computing_Security_A_Survey.

Sridhar et al., Seclogmon: Security in Cloud Computing Using Activity Log for Consumer Data Protection, *IEEE Xplore*, May 2017, 4 pages, Available Online at: https://ieeexplore.ieee.org/abstrac/documen/8256839.

Tung, Microsoft's Leash on Shadow IT is Open to all and now Supports Google Apps, *CSO Online*, Apr. 7, 2016, pp. 1-6, Available Online at: https://www.cso.com.au/article/597489/microsoft-leash-shadow-it-open-all-now -supports-google-apps/.

U.S. Appl. No. 16/657,545, Non-Final Office Action mailed on Jun. 23, 2021, 11 pages.

U.S. Appl. No. 16/657,545, Notice of Allow ance mailed on Oct. 8, 2021, 7 pages.

* cited by examiner

AUTONOMOUS MONITORING OF APPLICATIONS IN A CLOUD ENVIRONMENT

CROSS-REFERENCE TO RELATED APPLICATIONS

This application is a continuation of U.S. Non-Provisional application Ser. No. 16/657,545, filed Oct. 18, 2019, entitled "AUTONOMOUS MONITORING OF APPLICATIONS IN A CLOUD ENVIRONMENT" which claims the benefit of and priority to India Provisional Patent Application No. 201841039632, filed Oct. 19, 2018, and entitled "AUTONOMOUS MONITORING OF APPLICATIONS IN A CLOUD ENVIRONMENT," each of which are incorporated herein by reference. Patent Application No. 201841039632 includes an APPENDIX A, which is also incorporated herein by reference.

BACKGROUND

Cloud service providers provide various services in the "cloud;" that is, over a network, such as the public Internet, and remotely accessible to any network-connected client device. Examples of the service models used by cloud service providers (also referred to herein as "cloud providers" or "providers") include infrastructure as a service (IaaS), platform as a service (PaaS), software as a service (SaaS), and network as a service (NaaS). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to customer on a subscription basis, and is centrally hosted by the cloud provider. Under this model, applications can be accessed, for example, using a web browser. NaaS providers provide network services to customers, for example by provisioning a virtual network on the network infrastructure operated by another party. In each of these service models, the cloud service provider maintains and manages the hardware and/or software that provide the services, and little, if any, software executes on a user's device.

Customers of cloud service providers, which can be referred to as users or tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users. Examples of service providers include Box, Dropbox, Microsoft, Docusign, Google, Salesforce, Oracle, Amazon, and others. Service provider such as these can provide multiple different services, but different service providers need not have any affiliation with one another, including not sharing infrastructure or security boundaries. Service provider systems are often also heavily secured and closed to non-tenants.

The reliance of organizations on computing environments has led to widespread adoption of cloud services for operations such as collaboration, sales and customer services, infrastructures, and so on. Applications provided through a cloud environment may enable organizations to rollout services faster and without much upfront investment on data center, hardware, software, and deployment projects. The accessibility of applications can increase employee productivity due to the availability of cloud enabled services from many locations, such as at work, at home, at a hotel, and other locations.

Because organizations and/or users of an organization may subscribe to the services of many different cloud services providers, an organization may need ways to ensure the organization's own systems do not come to harm through the use of cloud services. Use of cloud services can lead to security risks that are not present when an organization hosts and manages services within the organization itself.

BRIEF SUMMARY

In some embodiments, a method for detecting usage anomalies in a multi-tenant cloud environment may include obtaining activity data from a service provider system. The activity data may describe actions performed during use of a cloud service. The actions may be performed by one or more users associated with a tenant. The service provider system may provide the tenant with a tenant account. The tenant account may enable the one or more users to access the cloud service. The method may also include determining, from the activity data, actions performed by a particular user. The method may additionally include generating, using the actions, a directed graph. Each node in the directed graph may represent an action performed by the particular user. Each connection between two nodes may represent a sequence in performance of actions represented by the two nodes.

In some embodiments, a system may include one or more processors and one or more memory devices including instructions that, when executed by the one or more processors, cause the one or more processors to perform operations including obtaining activity data from a service provider system. The activity data may describe actions performed during use of a cloud service. The actions may be performed by one or more users associated with a tenant. The service provider system may provide the tenant with a tenant account. The tenant account may enable the one or more users to access the cloud service. The operations may also include determining, from the activity data, actions performed by a particular user. The operations may additionally include generating, using the actions, a directed graph. Each node in the directed graph may represent an action performed by the particular user. Each connection between two nodes may represent a sequence in performance of actions represented by the two nodes.

In some embodiments, a non-transitory computer-readable medium may include instructions that, when executed by one or more processors, cause the one or more processors to perform operations including obtaining activity data from a service provider system. The activity data may describe actions performed during use of a cloud service. The actions may be performed by one or more users associated with a tenant. The service provider system may provide the tenant with a tenant account. The tenant account may enable the one or more users to access the cloud service. The operations may also include determining, from the activity data, actions performed by a particular user. The operations may additionally include generating, using the actions, a directed graph. Each node in the directed graph may represent an action performed by the particular user. Each connection between two nodes may represent a sequence in performance of actions represented by the two nodes.

In any embodiments, any of the following features may be implemented in any combination and without limitation. The method/operations may also include determining that an event in the activity data conflicts with a security control associated with the cloud service; determining that the event corresponds an event captured in the directed graph; and generating a recommendation that the security control be modified. The method/operations may also include determining that an event in the activity data violates a security policy; determining that the event corresponds to an event captured in the directed graph; and generating a recommendation to modify the security policy. The method/operations may also include obtaining additional activity data from the service provider system; mapping actions performed by the particular user to the directed graph; determining, from the mapping, that the particular user performed actions that do not correspond to the graph; and generating an alert that an anomaly has been detected. Weights assigned to each node may indicate a number of times the corresponding actions represented by the nodes were performed. A weight assigned to each connection between two nodes may indicate a number of times a first action represented by a first node from the two nodes preceded a second action represented by a second node from the two nodes. Each node may be associated with a set of contextual parameters that may be associated with the action represented by the node. The method/operations may also include receiving input including a request to register the cloud service with the security management system; configuring a pre-determined set of security controls for the cloud service; and/or using the directed graph to adjust the set of security controls. The method/operations may also include configuring a pre-determined set of security policies for the tenant; and using the directed graph to adjust the set of security policies.

DETAILED DESCRIPTION

Figure 1:
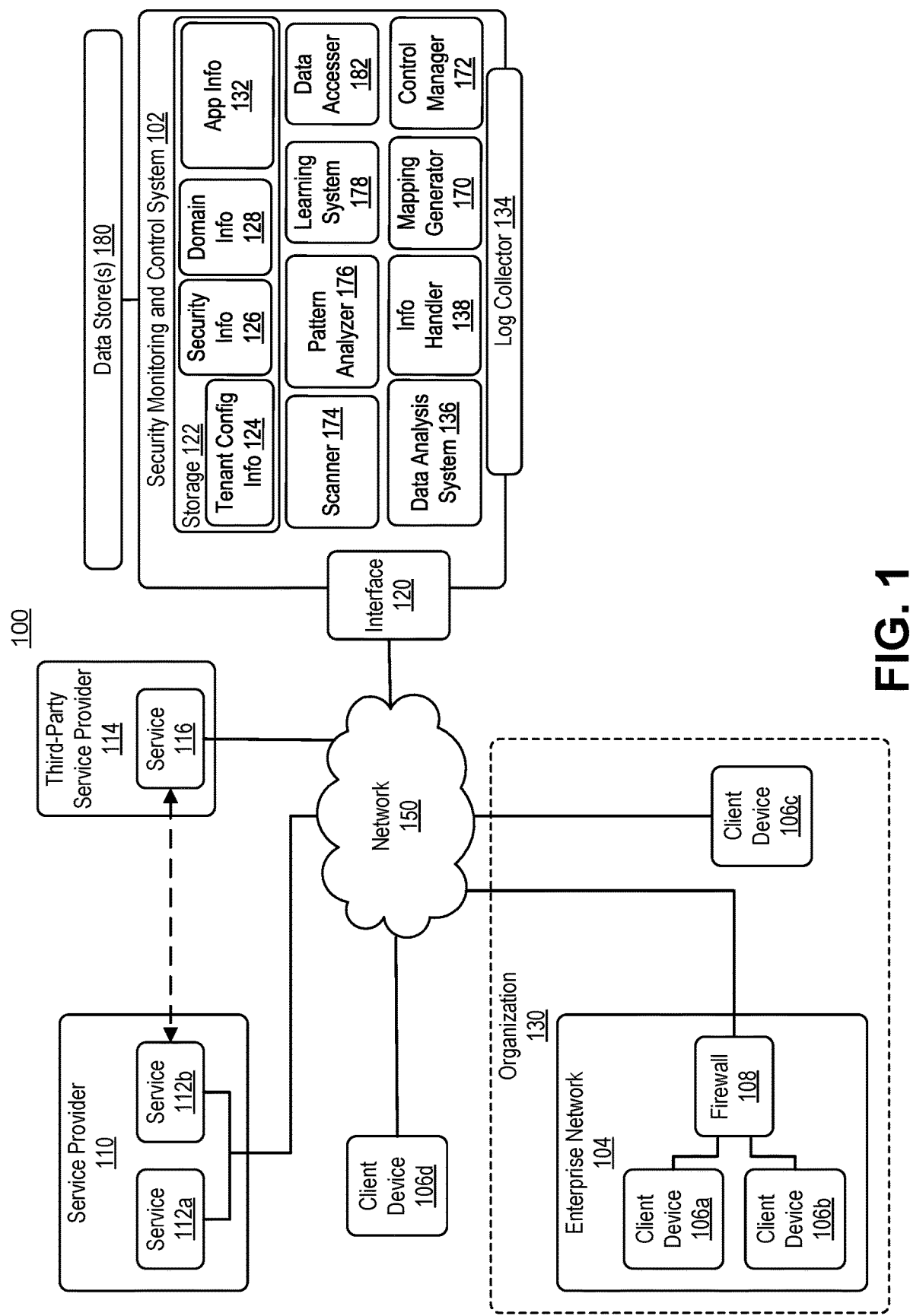
FIG. 1 includes a block diagram illustrating an example of a computing environment that includes a security monitoring and control system.

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

In various examples, a security monitoring and control and control system can monitor the use of cloud services by the users of an organization. Monitoring of users' activities as they use cloud services can be important for several reasons. Monitoring can, for example, detect security policy violations. In these examples, inclusion of a policy-driven alerting mechanism can allow tenants for the cloud service to monitor high-risk events. This is can be done by creating a set of policies to proactively monitor certain activities that have potential high impact on the operation of the tenant's networks. An example of a high-risk activity may include activities such as addition of a new bank account in the enterprise resource planning system, where the account is set up to receive disbursements.

Another reason why the monitoring of users' activities can be important is for threat detection and user behavior anomaly detection. Monitoring can, for example, identify compromised accounts and/or possible rogue administrators or users with access to sensitive business information who might misuse or tamper confidential business data to inflict damages to the organization.

A further reason why monitoring can be important is for compliance. Compliance auditors often require an audit trail for all activities in the cloud service to ensure that service complies with applicable laws.

In various examples, monitoring can be accomplished using various techniques. For example, security monitoring can include supervised or knowledge-based monitoring. In this example, high-risk events are monitored by defining a set of policies to detect specific events and remediate the events, if necessary. In addition, security best practices can be modeled and applied to a set of events to detect specific threats. As another example, security monitoring and may include unsupervised or automated anomaly detection. In this example, abnormal events or unusual pattern of events can be identified based on activities performed in the cloud service. In some examples, new anomalies may be reviewed by security experts for remediation. Known anomalies can be remediated automatically by examining a prior history of similar anomalies.

In various examples, the security monitoring and control system discussed herein can use several mechanisms for monitoring use of cloud services. For example, the system can include supervised or knowledge-based monitoring. In this example, supervised or knowledge-based monitoring can be used for security control monitoring, in which the system monitors a system configuration that governs a cloud service's security posture, which is managed by administrators. As another example, the system can include policy based monitoring, in which the system users policies to monitor high risk activities in the cloud service from an administrative perspective. As another example, the system can include threat detection, in which the system monitors user activities and detects security risks by analyzing historical as well as present audit trail data.

As a further example, the security monitoring and control system can use unsupervised or automated anomaly detection. For example, the system can generate profiles for user activities based on historical and present audit trail data, and use the profiles to detect unusual user activities, such as activities that a user never performed in the past or a change in a number of activities performed.

Monitoring methodologies such as those described above may result in too many false positives, which can mask real issues. False positives may occur because the system settings, policies, and/or threat detection logic require ongoing adjustments to ensure that appropriate criteria are applied to trigger an alert or a threat event. Security experts can analyze the output of the system to make the necessary adjustments, but doing so can be time consuming and inefficient.

One reason that the security monitoring and control system may output many false positives is a referred to as the "cold boot problem." Knowledge based system monitoring based on security controls and policies requires a deep understanding of the cloud service and usage pattern of the cloud applications. When the cloud application monitoring begins, the usage pattern is undefined. Thus, the system does not yet have an understanding of usage of the cloud services. Tuning and adjustment of the monitoring system can reduce false positives and ensure that only important alerts that are impactful and actionable are generated.

Deployment of a security monitoring and control system can require careful analysis of user activities, selective enabling of appropriate security controls, and generation of suitable policies. If tenants generate widely-scoped policies or security controls, then the system may generate too many false alerts. Security response teams managing such alert events may become overloaded and ignore important risk events as a result. Conversely, narrowly defined policies or security controls may not detect important risk events.

Similarly, automated anomaly-based threat detection may also generate too many false positives, because the system does not have an established pattern to eliminate false positive alerts generated by the system. Automated anomaly-based threat detection that uses learning can be self-tuning and self-configuring. However, security experts must analyze generated threats to eliminate false positives so that the system can learn the difference between a false positive and a true threat.

Remedying the cold boot problem can require consultation with the security experts to analyze the system on an ongoing basis and to perform reconfiguration, which can be inefficient and time consuming.

Another reason that the security monitoring and control system may output many false positives is due to changes in system and changes in usage patterns. Even when the predefined knowledge-based security control and policies work initially, user activity patterns may change, and additional new scenarios may develop. Lack of security controls and policies that accommodate these changes may cause the system to miss important events or fail to respond to an incident in a timely fashion. Additionally, when some of the events become a standard pattern rather than an exception, associated policies must be updated to ensure that the system triggers only on risky scenarios.

Automated anomaly-based threat detection logic also requires regular updates to incorporate feedback from the security experts as well as tenants to eliminate false positives.

In some embodiments, provided are systems and methods for analyzing actions performed by users in using a cloud service, and adjusting the configuration of a security management and control system based on the analysis. In various examples, the analysis may include generating a weighted directed graph that reflects a user's use of the cloud service, and/or reflects the tenant's overall use of the cloud service. In various examples, when the security monitoring and control system generates security alerts, the actions that resulted in the alerts can be compared to the graph to determine whether the actions are in accordance with prior behavior of the users. When the actions do correspond to the graph, the system can recommend that the security control or security policy that triggered the alert be modified. In various examples, the graphs can also be used to determine whether any user's actions are anomalous as compared to earlier behavior.

FIG. 1 includes a block diagram illustrating an example of a computing environment 100 that includes a security monitoring and control system 102 (also referred to herein as "security management system" and "security system"). The security monitoring and control system 102 can provide threat analysis and remediation for an organization 130 that uses services 112a-112b provided by a cloud service provider 110. Because the services 112a-112b are managed externally to the networks of the organization 130, network security systems of the organization 130 may not be able to ensure that use of the services 112a-112b does not create security risks for the organization 130. In various examples, the users of the organization 130 can access and use the services 112a-112b over an network 150 or a combination of networks. The network 150 can include, for example, the public Internet. The organization 130 can similarly access and use the services of the security monitoring and control system 102 over the network 150. In various examples, the security monitoring and control system 102 can also be described as a cloud service, which is administered by a cloud service provider. An example of a security monitoring and control system is Oracle CASB, which is a product and service offered by Oracle Corporation.

A service provider is a collection of hardware and software configured to provide computing services to others. The computing services can include, for example, hardware resources, processing resources, data storage, hardware platforms, software platforms, and/or applications of various levels of complexity, among other computing resources. In some cases, the service provider operates the hardware and software that enables the provider's services. In some cases, the service provider uses the hardware and software of another service provider. For example, a first service provider can be the operator of a data center, who leases software hosting services resources to a second service provider, who then provides an application such as a collaborative word processing application to users of an organization.

In various examples, service providers follow a subscription model, and lease use of a service to others, where the lease can last for a period of time. A subscriber, who is also referred to herein as a tenant, can be given an account with the service provider and/or with a particular service, through which the tenant uses the service. When the tenant is an organization, the tenant can have an account with the service provider (referred to herein as a tenant account or an enterprise account) and the organization's users can have individual user accounts with the service provider and/or the particular service. In some cases, the user accounts are tied to the account of the tenant, and the tenant account can control and manage the user accounts.

In some examples, a service provider can provide a service without direct remuneration from subscribers. For example, a service provider can provide a free email application, and obtain revenue for the service through other avenues, such as advertising. In this and other examples, subscribers can obtain an account with the service provider without a lease and possibly for an indefinite period of time.

In the example of FIG. 1, the service provider 110 is providing two services 112a-112b that are accessible, over a network 150, to customers of the service provider 110. The services 112a-112b can include, for example, infrastructure, platforms, networks, and applications, among other services. In some examples, the two services 112a-112b can be inter-related, such as being able to share data or being accessible through a single sign-on mechanism (e.g., one set of user credentials enables a user to access both services 112a-112b without needing to separately authenticate with each service). In some examples, the services 112a-112b operate entirely independently. For example, the first service 112a can be a banking application and the second service 112b can be a software development platform. In this example, the service provider 110 may be providing the two services 112a-112b as separate and unrelated products.

Customers of the service provider 110 can include individual users and/or organizations, where an organization can include multiple users. An organization is an entity that brings people and resources together to serve a common purpose or purposes. Examples of organizations include companies, universities, utilities, and governmental entities, among others. The people of the organization can be represented in the organization as users. In the context of the computing environment 100, a user is a digital entity that can include a user name, a user identifier, a user account, credentials (e.g., a password, security token, or another form of credential), and/or other data that can be used to access and use the computing systems of the organization. One or more people can be associated with the same user account, or one person can have multiple user accounts. For example, a member of the network administration team can use the same administrative user account that is used by other members of the network administration team, while also having a user account that is used only by the one network administrator. In some examples, activities of a user can be driven by automated programs (such as "bots") instead of or in addition to being driven by a human being.

In various examples, the users of the organization and the resources of the organization are under common administration and can operate within a same security perimeter. For example, in the example of FIG. 1, the resources of the organization 130 include an enterprise network 104 and a number of client devices 106a-106c. The client devices 106a-106c can include, for example, desktop computers, laptop computers, smartphones, tablets, and other computing devices. In some examples, the client devices 106a-106c can be personally owned by employees of the organization 130, but while these devices are connected to the enterprise network 104, the devices are administered by the organization 130. The enterprise network 104 can also include other computing devices, such as servers, printers, routers, switches, and other network devices. Resources of the organization 130 can also include data (e.g. documents, webpages, business data, user data, etc.), databases, applications, processing capacity, storage capacity, networking capacity, and other hardware, software, or digital resources.

In various examples, client devices 106a-106b of the organization 130 can be connected to and operate within the enterprise network 104. For example, the client devices 106a-106b can be connected to a switch within the enterprise network 104, which puts the client devices 106a-106b behind the firewall 108 of the enterprise network 104. Being behind the firewall 108, puts the client devices 106a-106b within the security perimeter of the enterprise network 104. Within the security perimeter, the firewall 108 and other network security systems, such as Security Information and Event Management (SIEM) applications, Intrusion Detection Systems (IDS), and Intrusion Prevention Systems (IPS), among others, can defend the devices in the enterprise network 104 from network threats.

In various examples, a client device 106c of the organization 130 can be connected to the organization 130 from outside the enterprise network 104. For example, the client device 106c can be connected to the network 150 through an Internet Service Provider (ISP), and through the network 150, the client device 106c may be able to connect to a Virtual Private Network (VPN) of the enterprise network 104, or a similar mechanism. Once connected to the VPN, the client device 106c can operate as part of the enterprise network 104, and be defended by the security perimeter of the enterprise network 104. In this example, however, the client devices 106c is simultaneously connect to the network 150 that is between the client device 106c and the enterprise network 104, and thus can still be exposed to security risks that can come from the network 150. Additionally, in some examples, the client device 106c may not need to be connected to the enterprise network 104 to be able to access the services 112a-112b of the service provider 110.

In various examples, the users of the organization 130 can make use of the resources of the organization 130 and the services 112a-112b that the organization 130 subscribes to through the client devices 106a-106c. which may be owned by the organization 130 and provided to the organization's members by the organization 130. In various examples, members can use any client device of the organization 130, and may be able to use multiple client devices. For example, the enterprise network 104 can include user workstations which any member can use to log in and access the member's user account. As another example, a member may have access to a laptop computer and a smartphone, and can log into to either device to access the same user account. Alternatively or additionally, the member can use a client device personally owned by the member to connect to the organization's network to make use of the organization 130 resources.

As noted above, a subscriber of the service provider's services 112a-112b can also be an individual who is not affiliated with or part of the organization 130. The individual may have access to a network-enabled client device 106d, through which the individual can access the services 112a-112b. The individual may have a user account with an ISP that enables the individual to access the network 150. Alternatively or additionally, the individual may have a user account with one or more of the services 112a-112b or The individual is not, however, able to use the client device 106d to connect to the enterprise network 104, because the individual does not have a user account with the organization 130 or credentials that enable the a user account to gain permission to connect to the enterprise network 104.

In various examples, individuals and organizations can subscribe to services provided by different service providers. For example, an organization can use an email service (e.g. Gmail from Google®) from one service provider and a file sharing service (e.g., Dropbox) from a different service provider. In this and other examples, the different service providers can be unrelated, including have separate computing systems for supporting their respective service and being controlled by different entities. In some examples, a user can have separate accounts with each service provider and/or each service provider's service. In some examples, a user may be able to use a common user account to access the services of different service providers.

In some examples, a cloud service can be authorized or unauthorized for use within the organization 130. An authorized service is one that the organization 130 has approved for use. Approval can include, for example, vetting the service through a certification process to ensure the service is secure, establishing a service contract with the service provider 110, placing the service provider 110 on a list of approved service providers, identifying the service provider 110 as a well-known and trusted service provider, and/or controlling the generation of user accounts with the service for the users of the organization 130, among other activities. For example, the service provider 110 can be categorized by the service provider 110 as a "trusted" service provider. In some examples, the organization 130 can categorize other service providers as "untrusted," or categorize all service providers that are not on the trusted list as untrusted. An unauthorized service is one that the organization may not have specifically approved, and that a user is using at the user's own discretion. For example, a user may be using a file sharing service that the organization 130 has not specifically authorized, possibly without the organization 130 being aware that the file sharing service is being used.

In some examples, the services 112a-112b of the service provider 110 can be executed or accessed through an application that can be executed from within the organization 130, and which may be authorized for use within the organization 130. For example, the organization 130 can have an authorized web browser application, through which users can access services such as a file sharing service or a database service. In this and other examples, the web browser application can be referred to as an internal application. In some examples, the internal application can operate cooperatively with the cloud services 112a-112b, including, for example, allowing the services 112a-112b to access data, user account information, or other information within the organization 130. Because the internal application is executing within the organization 130 (for example on client devices 106a-106c of the organization 130), the organization 130 can monitor and control usage of the internal application. The organization 130, however, may not be aware of or be able to monitor users' usage, through the internal application, of the services 112a-112b of the service provider 110.

In some examples, a user can access the services 112a-112b of the service provider 110 through a third-party service provider 114. For example, a user can first access a service 116 provided by the third-party service provider 114, and through this service 116, access the service 112b of another service provider 110 (illustrated here by a dashed arrow). The service 116 of the third-party service provider 114 can be, for example, a portal service that enables users to locate and access the applications and services of other cloud service providers. In some examples, the third-party service provider's service 116 provides access to other service over the network 150 (e.g., data to and from the service 116 that is for the other service 112b is transmitted to and from the other service 112b over the network 150) though the access may appear, from the user's perspective, to be direct. In some examples, the service 116 enables a user to establish a subscription with the other service 112b, after which the user access the other service 112b directly and without needing to access the service 116 of the third-party service provider 114.

Use of the cloud services 112a-112b can create a security risk for the subscribers of the services 112a-112b. For example, hardware, platforms, and software that are operating within the organization can, in most cases, be controlled by the organization and be secured by the organization, for example using physical barriers and/or network security tools. The cloud services 112a-112b, however, operate outside of the organization 130 and outside of direct control by the organization 130. The organization 130 may have little to no visibility into the activities users perform when using the services 112a-112b, or ability to control the actions the users perform. Additionally, the organization 130 may have little or no ability to monitor or control user actions that cause questionable data or unauthorized users to enter the organization 130 by way of the services 112a-112b, or that cause the organization's data to exit the organization 130 through use of the services 112a-112b.

In various implementations, the security monitoring and control system 102 can provide network threat detection and remediation services for subscribers of the cloud services 112a-112b. In various implementations, the security monitoring and control system 102 can analyze use of services 112a-112b and identify activities that may be a threat to an organization or individual subscriber. In some implementations, the security monitoring and control system 102 can further suggestion remediation actions, and/or can automatically perform remediation actions to isolate or stop the threat. In some examples, analysis performed by the security monitoring and control system 102 can include determining models of normal and/or abnormal behavior in user activity, and using the models to detect patterns of suspicious activity. In some examples, the security monitoring and control system 102 can simultaneously analyze data from different services and/or from different services providers. In these examples, the security monitoring and control system 102 may be able to detect suspect activity that is only evident when actions performed with different services occurs. In various examples, the security monitoring and control system 102 can determine remedial measures that can be executed at a service provider where suspect activity was detected, or at a different service provider, when the analyses determines actions may need to be taken at other service providers.

In some examples, the security management and control system 102 can be integrated into the computing environment of the organization 130. For example, the security monitoring and control system 102 can executing on a server in the enterprise network 104 and behind the firewall 108 of the organization 130. In these examples, the security management and control system 102 can be administered by the organization's network administrators, and/or by personnel associated with the developer of the security management and control system 102.

Alternatively or additionally, various examples, the capabilities of the security monitoring and control system 102 can be provided as a service to individual and organizations. For example, the network security services of the security monitoring and control system 102 can be offered as web-based cloud service, and/or under a Software as a Service (SaaS) model. In these and other examples, customers can use applications provided by the security monitoring and control system 102, where the applications provide various threat detection and remediation functions. As with the services 112a-112b of the service provider 110, individuals and organizations can subscribe to the security services provided by the security monitoring and control system 102. In some examples, a group users of the organization 130 can be designated as administrative users, and can manage the operations conducted by the security monitoring and control system 102 in monitoring security for the organization 130. These users may have access information such as reports generated by the security management and control system 102 and the ability perform remediation actions suggested by the security management and control system 102, among other capabilities.

In various implementations, security monitoring and control system 102 can be implemented using a computing system. In these implementations, the computing system can include one or more computers and/or servers (e.g., one or more access manager servers), which may be general purpose computers, specialized server computers (such as desktop servers, UNIX servers, mid-range servers, mainframe computers, rack-mounted servers, etc.), server farms, server clusters, distributed servers, or any other appropriate arrangement and/or combination of computing hardware. The security monitoring and control system 102 may run an operating system and/or a variety of additional server applications and/or mid-tier applications, including HyperText Transport Protocol (HTTP) servers, File Transport Service (FTP) servers, Common Gateway Interface (CGI) servers, Java servers, database servers, and other computing systems. Examples of database servers include, those commercially available from Oracle, Microsoft, and other. The security monitoring and control system 102 may be implemented using hardware, firmware, software, or combinations of hardware, firmware, and software.

In various implementations, the security monitoring and control system 102 may include at least one memory, one or more processing units (e.g., processor(s)), and/or storage. The processing unit(s) can be implemented as appropriate in hardware (e.g., integrated circuits), computer-executable instructions, firmware, or combinations of hardware and instructions. In some examples, the security monitoring and control system 102 can include several subsystems and/or modules. The subsystems and/or modules in the security monitoring and control system 102 may be implemented in hardware, software (e.g., program code or instructions executable by a processor) executing on hardware, or combinations thereof. In some examples, the software can be stored in a memory (e.g., a non-transitory computer-readable medium), on a memory device, or some other physical memory, and may be executed by one or more processing units (e.g., one or more processors, one or more processor cores, one or more Graphics Process Units (GPUs), etc.). Computer-executable instructions or firmware implementations of the processing unit(s) can include computer-executable or machine-executable instructions written in any suitable programming language, which can perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some examples, computer-readable storage media may be configured to protect a computer from an electronic communication containing malicious code. The computer-readable storage media may include instructions stored thereon, that when executed on a processor, perform operations of the security monitoring and control system 102.

In various implementations, the security monitoring and control system 102 can include various modules that implement different features of the security monitoring and control system 102. In the example of FIG. 1, these modules include a scanner 174, a pattern analyzer 176, a learning system 178, a data accesser 182, a data analysis system 136, an information handler system 138, a mapping generator 170, a control manager 172, a log collector system 134, and a interface 120. The security monitoring and control system 102 further includes storage 122, which stores various data that the security monitoring and control system 102 uses. In some examples, the security monitoring and control system 102 can also be connected to additional data stores 180, which can store additional data that the security monitoring and control system 102 may need.

In various examples, the storage 122 of the security monitoring and control system 102 can one or more data stores that store tenant configuration information 124, security information 126, domain information 128, and application information 132. In various examples, the storage 122 can include one or more databases (e.g., a document database, a relational database, or other type of database), one or more file stores, one or more file systems, or a combination of systems for storing data.

In various examples, the tenant configuration information 124 ("tenant config info"), can include configuration information for tenants and tenant accounts, as well as user accounts associated with each tenant account. When, for example, the organization 130 subscribes to the services of the security management and control system 102, the organization can provide the security management and control system 102 with information that identifies the organization's tenant account with the cloud service provider 110. In this example, security management and control system 102 can store the tenant account information in the tenant configuration information 124. In some cases, the organization 130 can also provide a list of user accounts with the service provider 110, which can also be stored in the tenant configuration information 124. Alternatively or additionally, in some examples, the security management and control system 102 can query the service provider 110 to determine the user accounts. In some examples, the security monitoring and control system 102 can use the association between a tenant account and the user accounts for the tenant's users in various ways, including to retrieve information about the activity of users associated with the tenant.

In some examples, the organization 130 can also provide authentication information to the security management and control system 102, where the authentication information can be used to log in to or otherwise access the services 112a-112b of the service provider 110. In various examples, the security management and control system 102 can use the authorization information to access the organization's tenant account 130 with the service provider 110. Authorization information can take the form of, for example, a token (e.g., an OAuth token), a username and password, or another form of credential. In some examples, the organization 130 can specify permissions or privileges with the authorization, which can define the level of access the security management and control system 102 has to the organization's tenant account. For example, the organization 130 can specify that the security management and control system 102 can change security settings for a service provided by the service provider 110, but that the security management and control system 102 cannot generate new user accounts or delete user accounts.

In various examples, the tenant configuration information 124 can store other information for the organization 130, such as, for example security, settings for accessing the services 112a-112b of the service provider 110, log settings, and/or access settings (e.g., security policies, security configurations, and whitelists and blacklists, among other things). In some examples, the organization 130 can specify a security setting for a service based on a level. For example, a security setting at a high level may require that user passwords be "strong," meaning, for example, that the password must include a variety of characters such as upper and lower case, numbers, and/or symbols. Similarly, security settings at different levels may set a session inactivity timer at higher or lower periods of time, such that, when the inactivity timer expires, the user's session is automatically ended, for example.

In some examples, the storage 122 can include security information 126 ("security info") that includes security analysis performed by the security monitoring and control system 102. In some examples, the security information 126 can include separate entries for different customers of the security monitoring and control system 102. In some examples, the security information 126 includes historic data: the results of past analysis (e.g., from the last month, last three months, last year, or some other past time period) which can be consulted when needed. In some examples, the security information 126 can further include records of past security incidents, determinations of whether the past security incidents were actual incidents or false positives, records of remediation actions taken for past incidents, and/or outcomes of performing remediation actions, among other data. In some examples, the security information 126 can further include network threat intelligence data, obtained, for example, from third-party threat intelligence aggregators and distributors.

In some examples, the storage 122 can include domain information 128 ("domain info") about the service provider 110 and other services providers. The domain information 128 can include, for example, a network address or location of the service provider 110, identification information for an owner or operator of the service provider 110 (e.g., the person or organization that owns and/operates the service provider 110) and information for verifying the identity of the service provider 110. The domain information 128 can be obtained, for example, by querying the service provider 110, requesting a certificate from the service provider 110, and/or requesting information from the service provider's ISP or the service provider's hosting service.

In some examples, the storage 122 can include application information 132 ("app info") that records user of a service provider's applications or services. The application information 132 can include, for example data logs collected from the organization 130 and/or activity logs obtained from the service provider 110. The application information 132 can record, for example, actions performed during use of the services 112a-112b of the service provider 110 as well as identification of the users who performed the actions, timestamps for when the actions were performed, network identification of network and/or geographic locations for the users when the users performed the actions, resources affected by the actions, and other information related to use of the services 112a-112b.

In various implementations, the security monitoring and control system 102 may be coupled to or in communication with one or more data stores 180. The data stores 180 may be implemented using any type of persistent storage device, such as a memory storage device or other non-transitory computer-readable storage medium. In some examples, the data stores 180 can include or implement one or more databases (e.g., a document database, a relational database, or other type of database), one or more file stores, one or more file systems, or combinations thereof. The data stores 180 may be implemented by and/or accessible as a service provided by a service provider system. The data stores 180 may include an interface for requesting data related to service or the service's service provider.

In some implementations, the security monitoring and control system 102 can include a log collector system 134 that performs operations for obtaining data on which the security monitoring and control system 102 can perform analysis. In various examples, the security monitoring and control system 102 can use different types of data or data sources for conducting threat analysis. For example, the security monitoring and control system 102 can use data obtained by monitoring the client devices 106a-106c through which the services 112a-112b are used, and/or obtained by monitoring points within an organization's network, such as at routers or the firewall 108. Herein, data obtained from client devices or within the organization's network is referred to as network data. To obtain network data, in some examples, monitoring agents can be placed on the client devices 106a-106c and/or on the network infrastructure of the organization's network. In these examples, the monitoring agents can capture user activity as a user makes use of cloud services.

As another example, the security monitoring and control system 102 can use data logs from the service provider 110. In various examples, the service provider 110 can record user activity as the services 112a-112b of the service provider 110 are used. For example, the service provider 110 can record when users log into a service, a network and/or geographic location for a user when the user logs in, actions performed by the user when the user uses a service, a resource affected by the action, and other information related to use of a service. Data from service providers are referred to herein as activity data or activity logs.

The following examples illustrate some examples of activity data that can be obtained from service providers. The following is a first example of activity data (e.g., an audit log record) that can be obtained from a service provider:

```
"entries": [
{
  "source": {
  "type": "user",
  "id": "222853877",
  "name": "Sandra Lee",
  "login": "sandra@company.com"
  },
  "created by": {
  "type": "user",
  "id": "222853866",
  "name": "Mike Smith",
  "login": "mike@company.com"
  },
  "created at": "2016-12-02T011:41:31-08:00",
  "event id": "b9a2393a-20cf-4307-90f5-004110dec233",
  "event type": "ADD_LOGIN_ACTIVITY_DEVICE",
  "ip address": "140.54.34.21",
  "type": "event",
  "session id": null,
  "additional details": null
}
```

The following is a second example of activity data (e.g., a shared file audit log record) that can be obtained from a service provider.

```
"entries":
{
  "type": "event",
  "source": {
    "parent": {
      "type": "folder",
      "id": "0",
      "name": "All Files"
    },
    "item name": "financial2017Q1.doc",
    "item type": "file",
    "item id": "159004949136"
  },
  "additional details": {
    "service name": "File Sharing App"
  }
```

```
  },
  "event type": "SHARE",
  "ip address": "140.191.225.186",
  "event id": "234d2f55-99d0-4737-9c3b-1a5256fe7c67",
  "created at": "2016-12-12T20:28:02-07:00",
  "created by": {
    "type": "user",
    "id": "238746411",
    "name": "John Smith",
    "login": "john@company.com"
  }
}
```

The following is a third example of activity data (e.g., an audit record) that can be obtained from a service provider.

```
{
  "Records":[
  {
    "eventVersion": "1.03",
    "userIdentity": {
    "type": "IAMUser",
    "principalId": "111122225533",
    "arn": "arn:aws:iam::111122223333:user/john",
    "accountId": "111122223335",
    "accessKeyId": "AKIAIOSFODNN7JOHN",
    "userName": "john"
    },
    "eventTime": "2016-12-26T20:46:31Z",
    "eventSource": "s3.amazonaws.com",
    "eventName": "PutBucket",
    "awsRegion": "us-west-2",
    "sourceIPAddress": "127.0.0.1",
    "userAgent": "H",
    "requestParameters": {
      "bucketName": "myprodbucket"
    },
    "responseElements": null,
    "requestID": "47B8E8D397DCE7D6",
    "eventID": "cdc4b7ed-e171-4cef-975a-ad829d4123c7",
    "eventType": "AwsApiCall",
    "recipientAccountId": "111122223344"
  }
```

The following is a fourth example of activity data (e.g., an audit record) that can be obtained from a service provider.
79a59df900b949e55d96a1e698fbacedfd6e09d98eacf8f 8d5218e7cd47efcde myprodbucket [06/Feb/202017: 00:01:57+0000] 192.0.2.3 Mary DD6CC733AMARY REST. GET. OBJECT s3-dg.pdf "GET/mybucket/ financial2016Q4.pdf HTTP/1.1" 200--4406583 4175428 "-" "S3Console/0.4"-

In some examples, the security monitoring and control system 102 can use data from other data sources, such as third-party feeds from network sources other than the organization's network or the service provider 110. Examples of other network sources can include network security data aggregators and distributors, social networking systems, news reporting or aggregating systems, governmental systems, reputation systems, and other systems.

In various implementations, the log collector system 134 can perform operations to obtain network data and/or activity data. For example, the log collector system 134 can be configured to communicate with software agents placed with the enterprise network 104 to network data logged by these agents. In this example, the network data can include network traffic generated as a user uses the services 112a-112b of the service provider 110 or the services of another service provider. In some examples, the network data can include other network traffic, such as network traffic generated as a user uses other network resources, such as resources of the organization 130 or resources on the Internet, such as websites. As another example, the log collector system 134 can be configured to communicate with the service provider 110 to obtain activity logs from the service provider 110. The service provider 110 can have, for example, and Application Programming Interface (API) that enables the log collector system 134 to request activity logs. In these examples, the log collector system 134 may be able to use the credentials of a tenant account with the service provider 110 to request the activity logs; that is, the log collector system 134 can pose as a tenant of the service provider 110 and make a request in the same way as would the tenant.

In various implementations, data obtained by the log collector system 134 can be processed by a data analysis system 136 in security monitoring and control system 102. The data analysis system 136 can conduct analysis on network data and activity data to perform operations such as discovery of applications being used, activity pattern learning and recognition, anomaly detection, and network threat detection, among other operations. These and other operations that can be performed by the data analysis system 136 are discussed further below.

In various implementations, the information handler system 138 of the security monitoring and control system 102 manages the data in the storage 122, including, for example, storing data, locating and retrieving data, organizing data, and updating data, among other operations. In some examples, the information handler system 138 received data from users of the organization 130, such as administrative users, who can provide information such as lists of the organization's users and data about the users. The data about the users can include, for example, roles or privileges for a user. In these and other examples, the information handler system 138 can manage storing of the user data in the appropriate data store in the storage 122.

In various implementations, the mapping generator 170 performs security analysis the organization 130 or another customer of the security monitoring and control system 102. For example, the mapping generator 170 can operate on output of the data analysis system 136 and compute a measure of security for a service, a user, a tenant, or combinations of services, users, and/or tenants. In some examples, the mapping generator 170 can obtain data from the interface 120 to perform security analysis. Security analysis operations are discussed further below.

In various implementations, a control manager 172 in the security monitoring and control system 102 can act on behalf of the organization 130 to manage access to the services 112a-112b of the service provider 110 by the organization's users. In various examples, the control manager 172 can provide this service for multiple cloud services or any cloud service that the organization's users use. In some examples, the control manager 172 can use access policies to control users' access to the services 112a-112b. An access policy can define, for example, types or categories of users that can or cannot use a service, specific users that can or cannot use a service, times of day or days of the week when a service can be used, an amount of data that can be transferred to or from the services, an amount of data bandwidth that can be used, actions that can or cannot be performed in using the service, to which users the access policy applies, and/or other restrictions or permissions with respect to the service. In various examples, the control manager 172 can maintain a set of policies for each organization that subscribes to the services of the security management and control system 102. In some examples, the control manager 172 can provide pre-sets with different levels of security, where selecting a pre-set selects the security configuration for one or more services. In these examples, the organization's selection of a pre-set can affect some or all of the organization's users ability to use the services.

In some examples, the control manager 172 can also maintain security policies for the organization 130. A security policy can define an action or set of actions that, when detected, constitute a security violation or an event that otherwise requires attention. In some examples, actions that are defined by a policy as a security violation can occur through use of one service, meaning that all the actions were performed while using the same service. In some examples, the actions can have occurred during use of more than one service, where the services are provided by one service provider or multiple service providers. In some examples, a security policy can also define one or more remediation actions to perform when a violation of the policy is detected. A remediation action can include, for example, sending a notification to the user who caused the violation, to network administrators of the organization 130, to administrators of the security management and control system 102, and/or to another entity.

In some examples, remediation can include modifying access to a service or to multiple services. For example, a remediation action can include preventing a particular user from using a service, or preventing all users of the organization 130 from using the service. As another example, a remediation action can include limiting the actions that can be performed in using a service. In some examples, performing a remediation action can include sending instructions to the enterprise network 104. In these examples, the instructions can, for example, configure a client device or a network infrastructure device such as the firewall 108. The client devices 106a-106c and/or the network infrastructure devices may, in some examples, be executing a software agent that enables the control manager 172 to communication with the devices, and make modifications to the devices. Modifications can include, for example, restricting access to a domain or Internet Protocol (IP) address, blocking all network traffic, disabling the device, or making some other modification to the device.

In some examples, performing a remediation action can include sending instructions to the service provider 110 to modify access to the services 112a-112b. In these examples, the remediation action can include determining instructions to send. For example, the control manager 172 can examine an API of the service provider 110 and/or of a service to identify instructions that can be performed to cause a desired change to the service. In this example, the API can define instructions that can, for example, prevent or limit access to the service by a user or a group of users of the organization 130. As another example, the API can define instructions that can disable or enable certain functionality of the service, wherein the disabling or enabling affects one or more users of the organization 130. In these and other examples, the modification to the service affects the users of the organization with which the remediation is associated, and does not affect the users of a different organization.

In various implementations, the security monitoring and control system 102 can include a learning system 178. The learning system 178 can apply various machine learning algorithms to data collected by the security monitoring and control system 102. The information learned about the data can then be used, for example, by the data analysis system 136 to make determinations about user activities in using services provided by the service provider 110. For example, the learning system 178 can learn patterns of normal or common behaviors of users of an organization. In these and other examples, the learning system 178 can generate models that capture patterns that the learning system 178 has learned, which can be stored in the storage 122 along with other data for an organization.

To support the learning system 178, in some implementations, the security monitoring and control system 102 includes a scanner 174 and a pattern analyzer 176. In these implementations, the scanner 174 can, for example, scan data for particular types of information. For example, the scanner 174 can extract the activities of a particular user, group of users, class of users, and/or all users associated with a particular tenant. As another example, the scanner 174 can extract activities relating to use of a particular service or set of services. As another example, the scanner 174 can extract activities relating to a particular service provider. In various implementations, the pattern analyzer 176 can use the data extracted by the scanner 174 to identify patterns in the data. For example, users and/or organizations may use services in repetitive ways or in cyclical ways. In these examples, the pattern analyzer 176 can identify repetitive behavior, and identify these patterns of behavior to the learning system 178.

In some examples, a data accesser 182 in the security monitoring and control system 102 can communicate with service providers to obtain activity data from those service providers. The activity data may be for a user account, a tenant account, a group account, or another type of account. The activity data may be obtained for a service, a particular type of data (e.g., a data for a particular attribute), one or more users, or combinations services, service providers, attributes, users, or other factors. In some examples, the data accesser 182 may process data to identify activity related to one or more criteria, such as one or more services, a particular type of data (e.g., a data for a particular attribute), one or more users, or combinations thereof.

In various implementations, the security management and control system 102 provides an interface 120 through which customers of the security management and control system 102 can use the services of the security management and control system 102. The interface 120 can provide, for example, a graphical user interface (GUI) that can display a control panel or dashboard that enables the organization's administrative users to configure the services of the security management and control system 102. The graphical user interface can further enable the administrative users to view reports of user activity with respect to the services 112a-112b of the service provider 110. The graphical user interface can further provide reports of security events and suggest remediation actions, and/or report on the outcome of remediation actions that the security management and control system 102 automatically performs. The graphical user interface can be implemented, for example, as software application that can be executed on the client devices 106a-106c of the organization 130. Alternatively or additionally, the graphical user interface can be implemented as a web-based interface (e.g., a website).

In some examples, the interface 120 can alternatively or additionally provide an API through which the organization 130 can manage the services provided by the security management and control system 102. The API can define actions to, for example, pull reports on user activity in using cloud services, pull reports on security events, issue instructions for remediation actions, obtain statistics on user activity, and/or other actions related to the services of the security management and control system 102. The API of the interface 120 can enable an organization to, for example, integrate the capabilities of the security management and control system 102 into the security infrastructure of the organization 130.

A system for security monitoring and control, in various implementations, can include multiple components that may be located on a single hardware platform or on multiple hardware platforms that are in communication with each other. Components can include software applications and/or modules that configure a server or other computing device to perform the operations of the security management and control system 102.

Figure 2:
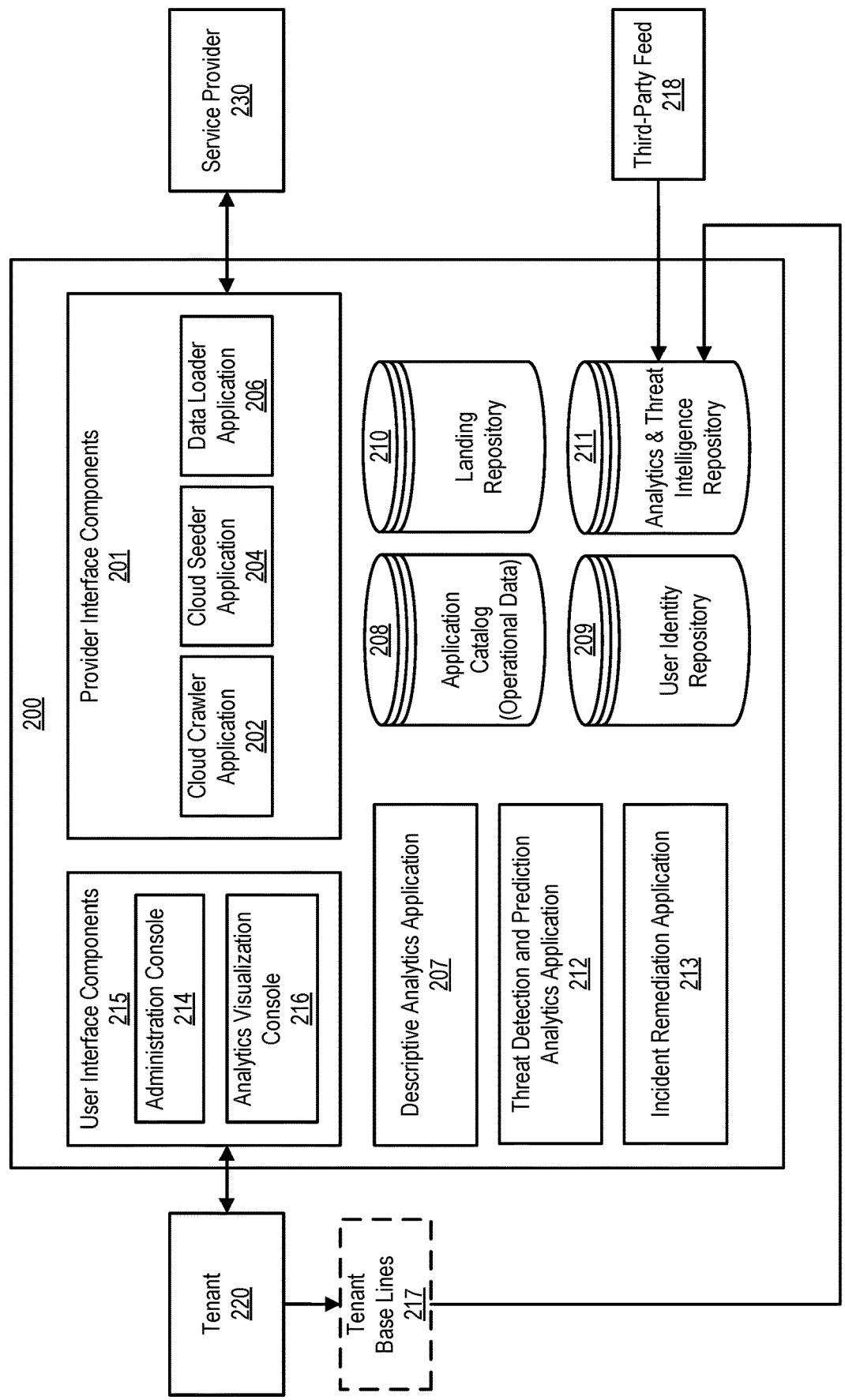
FIG. 2 illustrates a block diagram of an example cloud security system that can be implemented by a security management and control system.

FIG. 2 illustrates a block diagram of an example cloud security system 200 that can be implemented by a security management and control system. In various implementations, the example cloud security system 200 can conduct network threat analysis for a tenant 220 of a service provider 230, and determine whether actions by users of the tenant 220 in using a service of the service provider 230 constitute a network threat. In various implementations, the cloud security system 200 can include user interface components 215 for interfacing with a tenant 220 and provider interface components 201 for interfacing with a service provider 230. On the back end, the cloud security system 200 can include various applications for conducting analytics and data stores for storing data used in the analytics.

In the context of the example of FIG. 2, the tenant 220 is a tenant of the service provider 230, meaning that the tenant 220 is using a service of the service provider 230. When the cloud security system 200 is provided as a cloud service, the tenant 220 can also be a tenant of the cloud security system 200, n that the tenant 220 is using the services of the cloud security system 200.

In various examples, the user interface components 215 include an administration console 214 and an analytics visualization console 216. Using the administration console 214, the tenant 220 can configure the security controls for the services of the service provider 230. Configuration of the security controls can include, for example, enabling or disabling or disabling access to the service by the tenant's users, enabling or disabling features of the service that the tenant's users can use, and other configurations that are available to the tenant 220. The analytics visualization console 216 can be used to view analytics generated by the cloud security system 200. For example, using the analytics visualization console 216, the tenant 220 can view reports of security incidents involving the tenant's users and a service to which the tenant 220 is subscribing. In various examples, the information displayed in the administration console 214 and the analytics visualization console 216 can be obtained from the data stores of the cloud security system 200.

In various implementations, the administration console 214 can provide the tenant 220 with a normalized view of controls for multiple cloud service and/or cloud service providers. The administration console 214 can include a user interface that displays a simplified view of controls for different cloud services on the same screen. Information provided to the administration console 214 can be retrieved from an application catalog database 208 using metadata based schema mapping. In some examples, administration console 214 can be used to assign consistent access policies across cloud services. In these examples, administration console 214 can display controls and/or set controls according to specified classifiers, such as, for example, standard, stringent, or custom, among others. In this example, a higher level classification corresponds to more stringent controls. In some examples, classification and/or designation of security controls complies with criteria specified by organizations such as the National Institute of Standards and Technology (NIST), International Organization for Standardization (ISO), and/or Payment Card Industry Data Security Standard (PCI DSS) and/or a specific certification offered by one such organization. In some examples, the administration console 214 can also provide for plug-in interfaces to integrate with SaaS, PaaS, and native applications.

In various implementations, the analytics visualization console 216 can display security indicators in a library format with risk factors that are color coded (such as red, green, yellow). Other statistics or metrics may be displayed such as, for example, user logins attempts, groups with the most newly added users, deleted files, users with the most deleted files, and/or users downloading the most files, among other metrics. Some types of information may be specific to a particular service provider. For example, for Salesforce.com, the metrics can include the identities of users that are downloading opportunity or budget data, contracts, or contacts. In some examples, the analytics visualization console 216 provides a unified view of security controls for a tenant's cloud services. The analytics visualization console 216 may display a values set for any or all security controls set for different cloud services, as well as deviations of the current values from values associated with predetermined policies or configurations.

In various examples, the provider interface components 201 can applications that the cloud security system 200 can use to interface with the service provider 230. These components can include a cloud crawler application 202, a cloud seeder application 204, and a data loader application 206.

In various examples, the cloud crawler application 202 can retrieve information about security controls from the service provider 230. Data retrieved by the cloud crawler application 202 can be entered into an application catalog database 208. Retrieving information can include, for example, sending requests to the service provider 230 that are formulated to ask the service provider 230 for the security controls that are available for a service, and any available settings for the security controls. Alternatively or additionally, the service provider 230 can include an API through which the cloud crawler application 202 can obtain security controls for a service. In various examples, a cloud crawler application 202 can retrieve software defined security configuration data from the service provider 230. Software defined security configuration data can describe the configuration of security controls for a particular service. Security controls are mechanisms that restrict access to the application and/or data housed by the cloud service provider. For example, software defined security configuration data can include data describing roles that are defined for users, groups, and grouping of users; encryption keys; tokens; access controls; permissions; configurations; types of authentication policies; mobile access policies; and many other types of security controls.

In various examples, the cloud crawler application 202 can connect to the service provider 230 in order to obtain software defined security configuration data. The service provider 230 may require authorization or some other manifestation of consent for access to the service provider's systems. Authorization may be provided by a token (such as using the Open Authorization (OAuth) open standard for authorization) or by credentials (such as a username and password). The token or credentials can be that of the tenant 220, or a token or credential associated with the cloud security system 200. Various other techniques can be used to authorize access to a cloud provider's system and data. The connection may also include providing a service Uniform Resource Locator (URL).

In various examples, the software defined security configuration data can be collected by using an API of the service provider 230. Examples of APIs and classes of APIs include Representational State Transfer (REST), Java 2 Platform, Enterprise Edition (J2EE), Simple Object Access Protocol (SOAP), and native programmatic methods (such as native application API's for Java), among others. The information could also be requested using other techniques, such as scripting languages (such as Python and PHP), deployment descriptors, log files, database connectivity through Java Database Connectivity (JDBC) or REST, and resident applications (such as cloud beacons). The information that is sent or received can be represented in a variety of format, such as, JavaScript Object Notation (JSON), Extensible Markup Language (XML), or Comma Separated Values (CSV), among other formats.

Table 1 below provides an example of some security controls provided by cloud services providers Box and Amazon Web Services (AWS). Other cloud services providers can have similar security controls or other security controls.

TABLE 1

| Security Controls | Support in Box | Support in Amazon Web Services (AWS) |
| --- | --- | --- |
| Users/Group Management | REST (Representational State Transfer) API | AWS IAM (Identity and Access Management) APIs |
| Credentials and Identifiers | N/A | Secure and monitor Accounts, tokens, keys etc. |
| Login/Logout Events | REST API | AWS CloudTrail-Events API and Log files |
| IP address of the clients | REST API | AWS CloudTrail-Events API and Log files |
| Device (iphone, ipad etc) used by the clients | REST API | AWS CloudTrail-Events API and Log files |
| Password Policies | REST API | AWS IAM policies |
| Resource Access Permissions | Resources: Files, Folders Actions: Editing, Preview, upload, collaboration events | Resources: EC2, S3, EBS Actions: Create, Access, Restart, Terminate, etc. IP address based access controls |
| Restrict or limit Mobile access | Limit users from saving content for offline access | AWS IAM policies |
| Roles | BOX has pre-defined admin roles | Roles can be created using pre-defined policies |

Table 2 provides an example of some of the security controls and supported access for cloud services provider Salesforce.com. Other cloud services providers can use similar or other security controls and access controls.

TABLE 2

| Security Controls | Support in Salesforce.com |
| --- | --- |
| Users/Group Management | SalesForce User/Group/Profiles APIs |
| Credentials and Identifiers | APIs: Setup changes |
| Login/Logout Events | APIs: Audit activity |
| IP address of the clients | APIs: Audit activity |
| Device (iphone, ipad, etc.) used by the clients | API to manage Setup changes |

TABLE 2-continued

| Security Controls | Support in Salesforce.com |
| --- | --- |
| Password Policies | APIs: Setup changes |
| Resource Access Permissions | Salesforce object monitoring using object history |
| Restrict or limit Mobile access | APIs to manage Setup changes |
| Roles | Salesforce Profiles |

In various examples, the cloud crawler application 202 can generate security controls metadata from the software defined security configuration data obtained from the service provider 230. The security controls metadata is normalized descriptors for entering the information into a common database such as the application catalog database 208. The security controls metadata can be categorized (e.g., mapped into categories) and indexed. The categorization may comply with a standard specified by a security organization and/or may be certified and/or audited by a third party. In addition, the security controls metadata and/or the categorization of metadata may be formulated around the requirements of a particular regulation or standard. For example, regulations and standards such as the Health Insurance Portability and Accountability Act (HIPAA), the Sarbanes-Oxley Act, the Federal Risk and Authorization Management Program (FedRAMP), and/or the Payment Card Industry Data Security Standard (PCI DSS) may require reporting and audit trails. The security controls metadata can be formatted in a way to display the types of information required by the regulations and standards and facilitate the generation of reports needed.

The security controls metadata can be stored in the application catalog database 208. In some examples, the application catalog database 208 is an Apache Cassandra database, an open-source NoSQL database management system designed to handle large amounts of data across many commodity servers. In some examples, the application catalog database 028 is implemented using types of databases appropriate to the application. In some examples, a variety of databases can be used to store an application catalog for later retrieval, report generation, and analytics generation.

In various implementations, other methods can be used to retrieve software defined security configuration data and to generate security controls metadata. Additionally, various types of controls and mechanisms for retrieving software defined security configuration data may be supported by different cloud service providers. For example, other cloud applications such as Office 365, GitHub, Workday, and various Google applications use retrieval mechanisms specific to a service. Furthermore, processes for retrieving software defined security configuration data can be automated, depending on what is supported by a cloud service provider.

In various implementations, the cloud seeder application 204 can be used to implement security policies for the tenant 220. The cloud seeder application 204 can, for example, set security controls for a tenant's accounts with the service provider's services The security controls can affect, for example, one user account, multiple users accounts, or all user accounts. In some examples, the cloud seeder application 204 can set security controls in various situations. For example, the cloud seeder application 204 can set security controls as part of remediation of a threat or when called on by the tenant 220. In various examples, the cloud seeder application 204 can be used to coordinate consistent access policies across cloud services. In some examples, security controls can be coordinated across several accounts that an organization has with different service providers. For example, different levels of security may be defined such that, when a higher or lower level of security is selected, the security controls for an organization's accounts with different cloud services are all set to reflect the higher or lower level of security. In this way, a unified policy and security controls configuration can be enforced. The values for various security controls at different levels of security can be defined by input into a user interface, such as a controls management platform discussed above, and the values associated with the security controls at each level of security can be stored in a database. A user interface can be provided to show security controls for a organization's account with a cloud service and the assignment of security control values at a security level. As an example, security controls at a "stringent" level of security can include password requirements for a user account such as ten minimum characters, two numbers, one special character, one uppercase letter, no reuse of the last ten passwords, etc.

In various implementations, the data loader application 206 can retrieve activity data for the tenant 220 from the service provider 230. The activity data can come from logs generated by the service provider 230 as the tenant's users use the service providers services. In various examples, the data loader application 206 can obtain the activity data by requesting the data from the service provider 230. The data retrieved by the data loader application 206 can be entered into a landing repository 210 and/or analytics and threat intelligence repository 211. The data entered into a landing repository 210 may be in different formats and/or have different ranges of values, due, for example, from having been collected from different service providers. In some examples, the data from the data loader application 206 can be reformatted and/or structured before being moved to the analytics and threat intelligence repository 211 so that, for example, the data has a uniform format.

In various examples, the data loader application 206 can obtain activity data by connecting to and communicating with the service provider 230. In various examples, the connection is made over an encrypted communication channel. In some examples, the connection can be authenticated by a token or using login credentials, or another authentication method. In some examples, collection of activity data is scheduled to occur periodically (e.g., every four hours, every six hours, or at some other time interval). In some examples, the schedule for collection is configurable by the tenant 220. In some examples, the data loader application 206 collects data in real time as events occur, using a real-time computation system such as, for example, Apache Storm, open source distributed real-time computation system. The data loader application 206 may be configured to designate certain events or activities as high risk events, and these events can be retrieved near real-time, outside of the scheduled retrieval interval.

In various examples, activity data can include various types of information about the user of the service provider's services. For example, activity data associated with user accounts can include information relating to the use of, and/or actions taken with, a user account for a service. In this example, the activity data can include sources of information such as user logs and/or audit trails. More specific types of activity data can include, for example, login and logout statistics (including attempts and successes), file operations, access metrics, network download/upload metrics, application metrics (e.g., use, operations, functions, etc.), IP addresses used to access a service, devices used to access service, and/or cloud resources that were accessed (such as, for example, files and folders in a file management cloud application [such as Box], employees and contractors in a human resource cloud application [such as Workday], and/or contacts and accounts in a customer relationship management cloud application [such as Salesforce]). In various examples, activity data can include the user account or other user identifier for the user associated with the events or statistics. In various examples activity data can include information about system status or activity of a cloud system such as, for example, server activity, server reboots, security keys used by a server, and system credentials, where this information is visible or accessible to a system using authorized credentials.

In some examples, activity data may also include information about the security configuration of a tenant account, possibly including the security configuration of user accounts associated with the tenant account. The security configuration can include the values to which security controls for a tenant and/or user accounts associated with the tenant are set.

In various examples, the data loader application 206 can store retrieved activity data in the analytics and threat intelligence repository 211. The analytics and threat intelligence repository 211 can be any database or data repository with query capability. In some examples, the analytics and threat intelligence repository 211 is built in a NoSQL based infrastructure such as Apache Cassandra or another distributed data processing system, although any data warehouse infrastructure may be used as appropriate for the application. In some examples, the data is first entered into the landing repository 210 and reformatted and/or structured before being moved to the analytics and threat intelligence repository 211.

In some examples, the activity data may be received in different formats that are used by different service providers or services. For example, the data may be formatted in JSON or other data interchange formats, or may be available as log files or database entries. In some examples, the data loader application 206 performs operations for normalizing the data and reformatting the data into a common format for storage in, and retrieval from, the analytics and threat intelligence repository 211. Reformatting the data may include categorizing and structuring the data into the common format. In some examples, the database is adaptive to structural changes and new values, and can run automated processes to check for changed data. In some examples, the cloud crawler application 202 recognizes differences in the structure or values of the data retrieved, and can apply the changes to the application catalog database 208 and/or the analytics and threat intelligence repository 211.

In some examples, the data loader application 206 can pre-generate system reports. The system reports can be generated by jobs (e.g., processes) that are scheduled to run on the data set at periodic intervals. Data stored in an application catalog database 208 and/or analytics and threat intelligence repository 211 can be used to generate a variety of reports. Categories of reports can include, for example, authentication and authorization, network and device, systems and change data, resource access and availability, malware activity, and failures and critical errors, among others. Reports can be based on various attributes such as, for example, per application, per user, per secured resource, and per device used for access, among others. Reports may highlight recent changes such as updated features in a cloud application or newly modified policies. Reports may be pre-generated by scheduled jobs (e.g., for performance reasons) or may be requested by a user or administrator.

In some examples, reports include analytics generated on the data. Analytics may use Apache Software Foundation technologies such as Hadoop, Hive, Spark, and Mahout or other features as available in the data storage framework used. In some examples, the R programming language is used to generate analytics. In some examples, the generation of analytics includes the use of machine learning algorithms, proprietary algorithms, and/or external threat intelligence from external commercial sources such as FireEye and Norse or public threat intelligence communities such as Zeus and Tor.

In various implementations, the aggregation of activity information in the analytics and threat intelligence repository 211 concerning access patterns and other event statistics enables the system 200 to establish baselines of behavior. Machine learning techniques, for example, can be applied to detect threats and provide recommendations concerning how to respond to threats. Threat models can be developed to detect threats that are known or unknown or emerging. Threats can also be identified by comparing activity data with external threat intelligence information, such as information provided by third-party providers, as discussed further below. In various examples, data in the analytics and threat intelligence repository 211 can further be used to generate reports that may be presented visually to a system administrator via a user interface and to generate analytics for determining threat levels, detecting specific threats, and predicting potential threats, among other things.

In some examples, a single user of the tenant 220 can have multiple accounts with the service provider 230 and/or with the services provided by the service provider 230. In various examples, the various user accounts of one user can be associated together in a user identity repository 209. In some examples, the user identity repository 209 can group together the user accounts the user has with multiple service providers. In some examples, the tenant 220 can have a tenant account with the service provider 230. In these examples, the user identity repository 209 can associate users of the tenant 220 with the tenant account, which can associate the user accounts of the users with the tenant account as well. The association of user accounts to tenant accounts may be used in various ways, such as retrieving information about the user activity of the tenant's users. In some examples, the tenant account's credentials with the service provider 230 may be used to log into the service provider 230 to retrieve activity data for user accounts that are associated with the tenant account.

In various implementations, the user identity repository 209 can also be used to facilitate tracking of user activity and generation of profiles, where a profile can describe a particular user's use of a cloud service or of multiple cloud services. In some examples, the cloud security system 200 can use the profile of a user to take actions that affect multiple cloud services. For example, the cloud security system 200 can preemptively alert a system administrator when a user's activity in using several cloud services may be a security risk. Alternatively or additionally, as another example, the cloud security system 200 can proactively secure other services on which a user maintains data by applying remedial measures, such as adding additional steps to authentication, changing passwords, blocking a particular IP address or addresses, blocking email messages or senders, or locking accounts, among other things.

In various implementations, the cloud security system 200 can include applications or software modules to perform analytics on data collected by the cloud security system 200. The applications or software modules may be stored in volatile or non-volatile memory and, when executed, can configure a processor to perform certain functions or processes. These applications can include a descriptive analytics application 207 and a prediction analytics application 212. In some examples, the descriptive analytics application 207 can generate analytics such as statistics on users, user activity, and resources used by the users. In some examples, the threat detection and prediction analytics application 212 can generate analytics using machine learning and other algorithms. The analytics performed by the prediction analytics application 212 can include identifying and predicting security threats from patterns of activity and behavioral models. Analytics performed by the descriptive analytics application 207 and the prediction analytics application 212 can be performed using data stored in the analytics and threat intelligence repository 211.

In various implementations, the cloud security system 200 can include remediation functions that provide manual and/or automated processes for responding to threats. In some examples, analytics can use information received from tenant systems that describes threat intelligence provided by the tenant. These sources, which are referred to in the example system 200 as tenant base lines 217, can include information such as specific IP addresses to watch or block, users to watch or block, email addresses to watch or block, software vulnerabilities to monitor, browsers or browser versions that can be susceptible to misuse, and/or vulnerable mobile devices or versions of mobile hardware or software, among other things. In some examples, analytics can use information received from an external third-party feed 218. The source of the third-party feed 218 can be, for example, a threat intelligence aggregator or distributor. The information from the third-party feed 218 can be used to augment the threat analytics of the cloud security system 200 by providing external information about security threats. The external information can include, for example, identification of infected node points, malicious activity from a particular source IP address, malware infected email messages, vulnerable web browser versions, and known attacks on clouds, among other things.

In various implementations, an incident remediation application 213 can be used to coordinate and/or perform remediation actions in response to detected threats. In some examples, the incident remediation application 213 may be called when a recommended remediation action is presented and selected in an alert. The incident remediation application 213 may perform the selected remediation action or instruct another application, such as a cloud seeder application 204, to perform the selected remediation action. When the selected remediation action is to be manually performed or is external to the security system 200, the incident remediation application 213 can track the status of the remediation action and whether the remediation action is complete. In some examples, the incident remediation application 213 can be used to store the results of a manual or automated remediation action. In some examples, a selected remediation action is to be performed by a system external to the security system 200, such as by a third-party's or a tenant's incident remediation system. In these examples, the incident remediation application 213 can instruct or invoke the third-party's or tenant's incident remediation system to perform the action. For example, the incident remediation application 213 may have access to an automated integration process of the third-party or the tenant 220.

Figure 3:
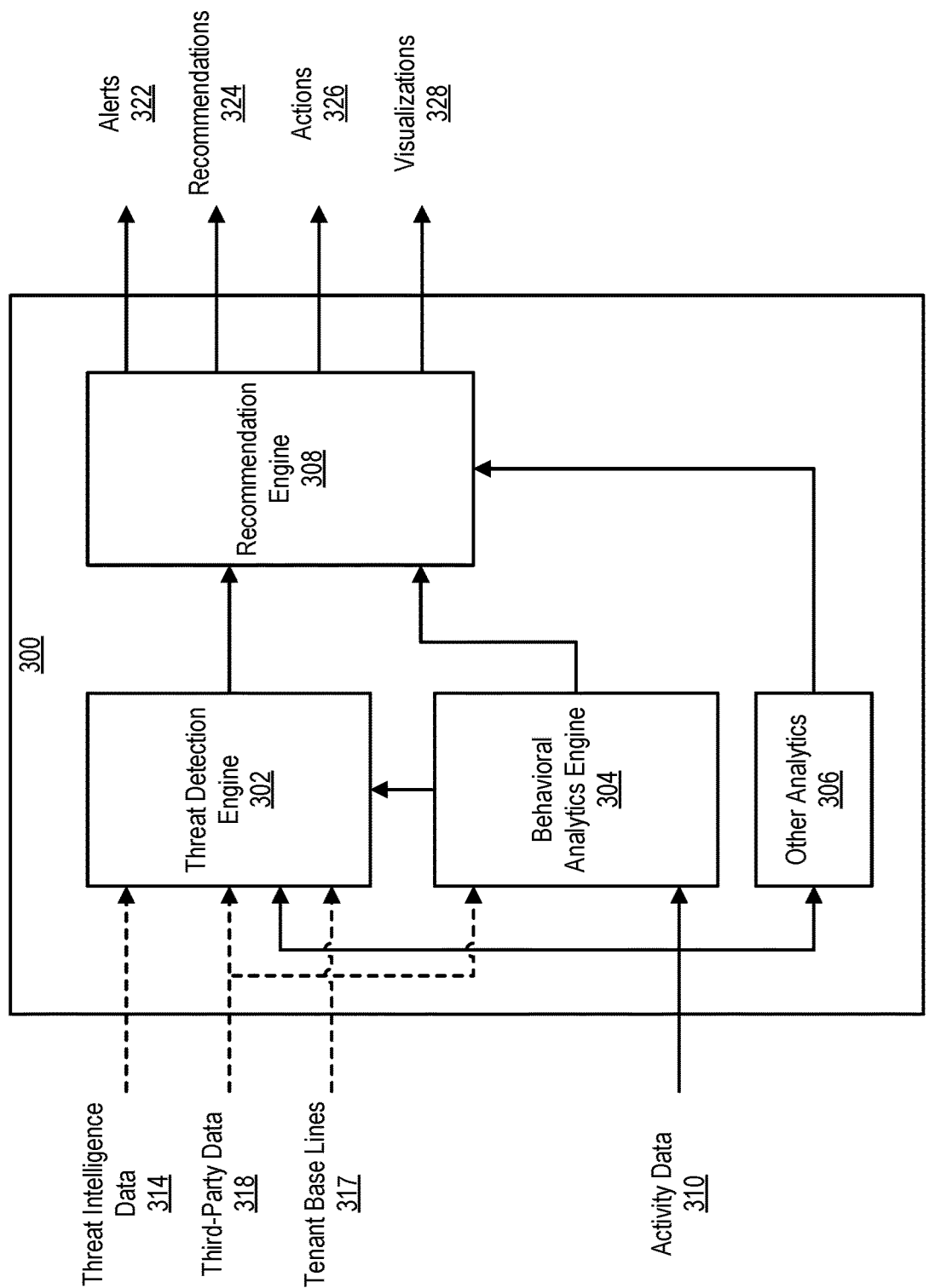
FIG. 3 illustrates a block diagram of an example analytics engine of a security management and control system.

FIG. 3 illustrates a block diagram of an example analytics engine 300 of a security management and control system. In various examples, the analytics engine 300 can analyze various data sources to identify network threats for an organization whose users are using cloud services. In various examples, the operations of the analytics engine 300 can be used to detect and/or address various treat scenarios.

One example of a threat scenario is IP hopping. In an IP hopping scenario, an attacker may use one or more proxy servers to hide the attacker's true location or machine identity before mounting an attack. Detection of this type of scenario can involve geographic resolution (e.g., identifying or looking up a geographic location associated with an IP address) of each IP connection used to connect to a cloud application. Detection can further include detecting anomalous characteristics in the spatial data, and predicting a threat from this information. Metrics used for detection can include, for example, a count of the number of unique IP addresses used by a user per day and/or a velocity, which can refer to the time difference between the use of different IP addresses and the/or duration that each IP address used.

Another example of a threat scenario is an unusual geolocation scenario. An unusual geolocation scenario may refer to activities being originated in locations that are unexpected or outside of an established pattern. This scenario may include activities such as, but not limited to, successful logins or file upload/download from unusual geolocations.

Another example of a threat scenario is a brute force attack. An example of a brute force attack is when an attacker's attempts to try many passwords in order to discover a correct password and compromise a user account. Detection may involve evaluating the velocity of failed login attempts and patterns in event activities to predict a brute force attack. In some examples, brute force attacks may have different speeds, such as a slow attack speed or fast attack speed. Metrics for detection can include, for example, an unusually high number of login failures for existing valid accounts and/or an unusually high number of login attempts with invalid or terminal/suspended usernames.

Another example of a threat scenario is an insider threat. Insider threats can refer to security breaches perpetrated by a person from within a network. For example, an employee of an organization, who has been authorized, through the course of employment with the organization, may misuse the authorization and intentionally or unintentionally case a security breach. Detection of an insider threat can involve tracking a user's normal behavior and generating alerts when events or activities associated with the user's account or accounts deviate from the norm. Metrics can include, for example, an usually high use of corporate resources such as a high number of downloads and/or an employee with a low rating downloading or sharing an unusually high number of files/folders, deleting code from a source code control system, or downloading, deleting, or modifying customer information, among other things.

Another example of a threat scenario is application misuse. Application misuse is a scenario that can include events associated with a terminated or suspending employee (e.g., use of an expired or revoked user account, use cryptographic keys such as a Secure Shell (SSH) key, etc.) or a malware-infected device performing an unusual number of file downloads/uploads using valid credentials, but an unusual geolocation or IP address, for example.

While specific threat scenarios and types of information that can be used to discern these scenarios are discussed above, one skilled in the art would recognize that threat detection and prediction may utilize any of a variety of information and formulas.

In various examples, the analytics engine 300 can detect the threat scenarios discussed above, as well as other threat scenarios, by examining various external and internal data sources. External data sources can provide activity data 310 obtained from cloud service providers. In some examples, external data can optionally include tenant base lines 317 and third-party data 318. In some examples internal data sources can include data models determined by a behavioral analytics engine 304 and can optionally include threat intelligence data 314 maintained by the security management and control system.

In various examples, cloud services can store user activities as user use the cloud services. For example, a cloud service can store each occurrence of a user logging in to use the service, the actions the user performs while using the service, the resources affected by the actions, data that is moved into, out of, or within the service, and/or the user logging out at the end of a session, among other things. In these and other examples can store the user's activities in a log file, which is referred to herein as an activity log. An entry in an activity log can include, for example, an action performed or a description of an action performed, identification of a user who performed the action, a resource affected by the action, the time at which the action was performed or what time the action was initiated and/or completed, and/or a network location or geolocation for the user who performed the action, among other information. In the example of FIG. 3, the activity data 310 can include activity logs for multiple services and/or multiple service providers. In these and other examples, one activity log can include user activity for one service or for multiple services provided by the same service provider.

In various examples, the analytics engine 300 receives updated activity data 310 once per day, every other day, or periodically over another time interval. In some examples, the analytics engine 300 receives activity data 310 when certain events occur, such as a service indicating that an event has occurred (e.g., the service has been updated or the service has detected a network threat or another event originating at the service), the organization indicating that an event has occurred (e.g., the organization having added users to the service or a network administrator requesting an updated analysis or another event originating at the organization), or the security management and control system indicating that an event has occurred (e.g., receipt of new threat intelligence data 314 or another event originating at the security management and control system.

In some examples, activity logs from different cloud services may have different formats. For example, entries in one activity log may be provided as comma-separated values, while another activity log may use JSON syntax. In these and other examples, the data in the activity logs may be normalized by the analytics engine 300 or prior to being provided to the analytics engine 300. Normalizing the activity data 310 include reformatting the activity data 310 such data from different services and/or service providers is comparable, has the same meaning, and/or bears the same significance and relevance. After normalization, the behavioral analytics engine 304 can aggregate and compare data from different cloud services in meaningful ways. For example, a series of failed login attempts by one user with one cloud service may be deemed not to be a threat. However, a series of failed logins by the same user but at multiple different cloud services indicate a concerted effort to crack the user's password and should thus set off an alarm.

In various examples, the activity data 310 can be ingested in the analytics engine 300 by a behavioral analytics engine 304. In various implementations, the behavioral analytics engine 304 can collect statistics from the activity data 310 and identify behavioral characteristics from the activity data 310. Statistics can include, for example, counts of actions, such as successful login attempts or failed login attempts. In some examples, statistics can be associated with a particular service provider, a particular service, a particular user, a particular action that can be performed in using a service, a particular time frame, other factors, and/or a combination of factors.

In various implementations, the behavioral analytics engine 304 can use statistical data generated from the activity data 310 to determine activity profiles, which are also referred to herein as behavioral profiles. For example, the behavioral analytics engine 304 can generate an activity profile that describes the common or typical usage pattern of a service by the users of a particular organization. As another example, the behavioral analytics engine 304 can generate an activity profile for a particular user or group of users. In this example, the activity profile can describe a user's activity in using one service or multiple services. In various examples, to identify a user's activity across services, the behavioral analytics engine 304 can have access to user identity data, which can link together a particular user's accounts with different cloud services. the user identity data can include, for example, the user's username or other form of identification with each cloud service. In various examples, the user identity data can be provided by an organization. Alternatively or additionally, in some examples, the security management and control system can automatically determine that different user accounts are related. For example, the security management and control system can assume that user accounts with the same user name or originating with the same IP address or Media Access Control (MAC) address should be linked.

In some examples, the behavioral analytics engine 304 can include contextual data in the activity profile for a user. Contextual data can be obtained, for example, from third-party data 318, where the source of the third-party data 318 is a reputation system, a social media system, a news aggregator or provider, or another system that can maintain information about a user. Examples of contextual data include, travel location and itinerary from travel applications or email, employee status from healthcare management systems, sensitive financial time period from a Salesforce application, and/or sensitive emails from email servers, among other data. In some examples, contextual data can additionally or alternatively be obtained from client devices used by the user. In these examples the contextual data can include, for example, identification of a type of the client device, IP addresses used by the client device, geolocation data computed by a Global Positioning System (GPS) receiver of the client device, and other information about the client device or that can be obtained from the client device.

In various examples, activity profiles can cover different time periods. In some examples, activity profiles can use a fixed moving window covering a time period measured in weeks. In some examples, an "emerging profile" can be generated, which capture events that are relatively recent, such as within the last week or within a week prior to a target date. In some examples, a "stable profile" can be generated, which includes events within the last four (or eight) weeks or within four (or eight) weeks prior to a target date. In various examples, other profiles or profile types can be generated.

In some examples, fixed moving windows can be non-overlapping. That is, a window that goes further back in time can exclude events in a window that is more recent in time. For example, an eight week profile does not include events in a four week profile or one week profile and similarly the four week profile does not include events within the one week profile. Daily (or periodic) aggregation processes may be run intra-day or inter-day.

Table 3 below shows example calculated statistics for some user activities. The example user activities include an average login count for a four week window profile ("avglogcntday4wk"), an average login IP address count for a four week window profile ("avglogipcntday42k"), a standard deviation of login count for a one week window profile ("stdlogcntday1wk"), and a standard deviation of login IP address count for a one week window profile ("stdlogipcntday1wk"). Similar and other statistics can be calculated, depending on the available data and/or the threat being predicted.

TABLE 3

| User ID | avglogcntday_4wk | avglogipcntday_4wk | stdlogcntday_1wk | stdlogipcntday_1wk |
|---|---|---|---|---|
| User 1 | 5 | 4 | 3 | 2 |
| User 2 | 6 | 2 | 2 | 1 |
| User 3 | 4 | 3 | 2 | 2 |
| User 4 | 4 | 4 | 2 | 1 |
| User 5 | 5 | 5 | 1 | 1 |

Statistics such as those illustrated above can be combined into a feature vector. Feature vectors can include, for example, a count of a number of logins, a count of a number of distinct IP addresses used for logging in, a maximum distance between any two IP addresses used to log in within a 24-hour time period, a count of a number of distinct browsers used in connections to the cloud application within a 24 hour time period, and/or other measures. Feature vectors may be aggregated per cloud application and/or per user per cloud application.

Table 4 below shows example daily aggregation matrix vectors. The first column provides example application providers, the second column illustrates vector dimensions that may be supported by the providers, and the third column illustrates values that can be assigned to each dimension.

TABLE 4

| Application | Dimension | Description |
|---|---|---|
| Amazon, Salesforce, Box | Login | (# of count, Avg, Stddev, Max) |
| Amazon, Salesforce, Box | Failed Login | (# of count, Avg, Stddev, Max) |
| Amazon, Salesforce, Box | Login IP | (# of count, Avg, Stddev, Max) |
| Amazon, Salesforce, Box | Failed Login IP | (# of count, Avg, Stddev, Max) |
| Box | Download | (# of count, Avg, Stddev, Max) |
| Box | Download IP | (# of count, Avg, Stddev, Max) |
| Salesforce | Browsers | (# of count, Avg, Stddev, Max) |
| Salesforce | Mass Delete, Mass Transfer, Data Export | (# of count, Avg, Stddev, Max) |
| Salesforce | Certificate and Key Management | (# of count, Avg, Stddev, Max) |
| Salesforce | Network Access and IP Whitelist Changes | (# of count, Avg, Stddev, Max) |

TABLE 4-continued

| Application | Dimension | Description |
|---|---|---|
| Salesforce | Manage User Changes | (# of count, Avg, Stddev, Max) |
| Salesforce | Platforms | (# of count, Avg, Stddev, Max) |
| Salesforce | Password Policy Changes | (# of count, Avg, Stddev, Max) |
| Salesforce | Shared Setting Changes | (# of count, Avg, Stddev, Max) |
| Amazon | EC2 Instance Changes | (# of count, Avg, Stddev, Max) |
| Amazon | Security Group Changes | (# of count, Avg, Stddev, Max) |
| Amazon | SSH Key Pair Changes | (# of count, Avg, Stddev, Max) |
| Amazon | Network ACL Changes | (# of count, Avg, Stddev, Max) |
| Amazon | VPN Connection Changes | (# of count, Avg, Stddev, Max) |
| Amazon | SAML Changes | (# of count, Avg, Stddev, Max) |
| Amazon | VPC Changes | (# of count, Avg, Stddev, Max) |
| Amazon | IAM Access Key Changes | (# of count, Avg, Stddev, Max) |

Table 5 below lists example values for several possible daily aggregation matrix vectors. The example vectors illustrated here include a count of logins per day for one day ("logcntday_1dy"), a count of failed logins per day for one day ("logfailcntday_1dy"), a count per day of IP addresses from which failed logins occurred over one day ("logfailipdisday_1dy"), and a count per day of IP addresses used to log in over one day ("logipdisday_1dy").

TABLE 5

| User ID | logcntday_1dy | logfailcntday_1dy | logfailipdisday_1dy | logipdisday_1dy |
|---|---|---|---|---|
| User1 | 5 | 4 | 3 | 2 |
| User2 | 6 | 2 | 2 | 1 |
| User3 | 4 | 3 | 2 | 2 |
| User4 | 4 | 4 | 2 | 1 |
| User5 | 5 | 5 | 1 | 1 |

In various examples, activity profiles determined by the behavioral analytics engine 304 can be used by the threat detection engine 302 to identify usage of a cloud service that may pose a threat to an organization that is using the cloud service. In some examples, the threat detection engine 302 applies security policies to identify a threat. A security policy can describe an event that, when the event occurs, the event is brought to the attention of the organization and/or the security management and control system. For example, security policies can specify actions, such as downloading a file containing credit card numbers, copying encryption keys, elevating privileges of a normal user, and so on, that need to be brought to the attention of the organization. In some examples, a security policy can also describe an action that is to be taken when an event is detected, such as blocking access to a service, or disabling a user account.

In some examples, the threat detection engine 302 conducts anomaly detection to identify a threat. Anomaly detection can involve searching for statistical variations from an established norm. In some examples, the operations of the threat detection engine 302 can be augmented by a tenant base line 317, which can include threat intelligence from the organization. In some examples, the threat detection engine 302 can alternatively or additionally receive threat intelligence data 314 that is maintained by the security management and control system, and/or third-party data 318 that includes threat intelligence from, for example, threat intelligence aggregators or distributors.

Provided below are various example algorithms that can be used for anomaly detection. These algorithms are provided as examples, and other algorithms can be used.

Algorithm 1 is one example of an algorithm that can be used to determine login IP address variations. Z-scores can be calculated for a login IP address feature vector over different time periods. The example that follows uses one week, four weeks, and eight weeks as examples of time different time periods, resulting in three Z-scores:

$$L1ZScore = \frac{\text{Login } IP \text{ past } 24hrs - 1wkAvg \text{ Login } IP}{1WkStddev \text{ Login } IP}$$

$$L2ZScore = \frac{\text{Login } IP \text{ past } 24hrs - 4wkAvg \text{ Login } IP}{4WkStddev \text{ Login } IP}$$

$$L3ZScore = \frac{\text{Login } IP \text{ past } 24hrs - 8wkAvg \text{ Login } IP}{8WkStddev \text{ Login } IP}$$

The Z-scores may be combined with weights (w1 ... w3) assigned to each score, as follows:

L Combined=(w1×L1ZScore)+(w2×L2ZScore)+(w3× L3ZScore)

In some examples, the sum of the weights is one. Weights that are applied may be calculated dynamically depending on when the calculation is performed. For example, at day one, default baselines may be applied using values calculated based on existing data, including a default Avg (average) and default Stddev (standard deviation). As a further example, for the first week, starting from day two, an L1 Z-Score is available, so that the weights can be set to w1=1, w2=0, w3=0. Continuing with the example, after five weeks, L1 and L2 Z-Scores are available, and the weights can be set to w1=0.4, w2=0.6, w3=0. After 14 weeks, L1, L2, and L3 Z-Scores are available, so that the weight can be set to w1=0.2, w2=0.3, w3=0.5. An anomaly condition in the variation in login IP addresses may be defined as L_Combined>T where T is a threshold. The threshold can be determined from previous data and/or can be modified over time.

Algorithm 2 is an example of an algorithm that can be used to detect failed login IP address variations. Z-Scores may be calculated for a login IP address feature vector over different time periods, here illustrated as one week, four weeks, and eight weeks, as an example:

$$L1ZScore = \frac{\text{Failed Login } IP \text{ past } 24hrs - 1wkAvg \text{ Failed Login } IP}{1WkStddev \text{ Failed Login } IP}$$

$$L2ZScore = \frac{\text{Failed Login } IP \text{ past } 24hrs - 4wkAvg \text{ Failed Login } IP}{4WkStddev \text{ Failed Login } IP}$$

$$L3ZScore = \frac{\text{Failed Login } IP \text{ past } 24hrs - 8wkAvg \text{ Failed Login } IP}{8WkStddev \text{ Failed Login } IP}$$

The Z-scores for the failed login IP addresses may be combined with weights (w1 ... w3) assigned to each score, as follows:

L Combined=(w1×L1ZScore)+(w2×L2ZScore)+(w3× L3ZScore)

In various examples, weights that are applied may be calculated dynamically depending on when the calculation is performed. For example, at day one, default baselines may be applied using values calculated based on existing data, including a default Avg (average) and default Stddev (standard deviation). In this example, the weights can be varied as the weeks progress, as provided in the example of Algorithm 1. An anomaly condition in the variation in login IP addresses may be defined as L_Combined>T where T is a threshold. The threshold can be determined from previous data and/or can be modified over time.

In various examples, anomalous activity that is detected for a user of one cloud service can be used by the threat detection engine 302 to calculate or re-calculate the likelihood of a threat in the use of another cloud service. In this way, new events occurring during the use of one cloud service can be screened proactively to detect and/or predict threats in the use of another cloud service. In various examples, multiple data points across different cloud services can be correlated to increase the accuracy of a threat score.

Algorithm 3 provides an example of an algorithm that can be used for analytics of multiple application behavior. In algorithm 3, user IP addresses associated with various cloud service activities (such as logging in) are resolved to geo-location coordinates IP1 (Latitude 1, Longitude 1), IP2 (Latitude 2, Longitude 2), IP3 (Latitude 3, Longitude 3), etc. If a user has different usernames with different cloud services, the various usernames associated with that user can be mapped to a unique user specific identity that identifies the user across the services. The distance between any two IP addresses used for logins (e.g., login attempts, successful logins, and/or failed logins) with any of a number of cloud service (e.g., Amazon Web Services, Box, Salesforce, etc.) can be calculated using any of a variety of distance measurements and/or formulas. In some examples, the distance d is calculated using the Haversine Distance formula, as follows:

$$Diff_{Long} = \text{Longitude2} - \text{Longitude1}$$

$$Diff_{Latitude} = \text{Latitude2} - \text{Latitude1}$$

$$a = \left(\sin\left(\frac{Diff_{Latitude}}{2}\right)\right)^2 +$$

$$(\cos(\text{Latitude1}) \times \cos(\text{Latitude 2}) \times \left(\sin\left(\frac{Diff_{Long}}{2}\right)\right)^2$$

$$c = 2 \times a\tan2(\sqrt{a}, \sqrt{1-a})$$

$$d = R \times c$$

In the equation for d, R is the radius of the Earth.

Z-Scores can be calculated to determine deviation of user behavior over different time periods using maximum distances as calculated above. As an example, time periods of 1 week, 4 weeks, and 8 weeks are shown:

$$L1ZScore = \frac{\text{Maxdist } IP \text{ Login past } 24hrs - 1wkAvg(\text{Maxdist } IP \text{ Login per day})}{1WkStddev(\text{Maxdist between } IP \text{ Login } IP \text{ per day})}$$

$$L2ZScore = \frac{\text{Maxdist } IP \text{ Login past } 24hrs - 4wkAvg(\text{Maxdist } IP \text{ Login per day})}{4WkStddev(\text{Maxdist between } IP \text{ Login } IP \text{ per day})}$$

$$L3ZScore = \frac{\text{Maxdist } IP \text{ Login past } 24hrs - 8wkAvg(\text{Maxdist } IP \text{ Login per day})}{8WkStddev(\text{Maxdist between } IP \text{ Login } IP \text{ per day})}$$

The Z-scores may be combined with weights (w1 ... w3) assigned to each score, as follows:

L Combined=(w1×L1ZScore)+(w2×L2ZScore)+(w3× L3ZScore)

In various examples, weights that are applied may be calculated dynamically depending on when the calculation is performed. For example, at day one, default baselines may be applied using values calculated based on existing data, including a default Avg (average) and default Stddev (standard deviation). In this example, the weights can be varied as time progresses, as provided above. An anomaly condition in the variation in login IP addresses may be defined as L_Combined>T where T is a threshold. The threshold can be determined from previous data and/or can be modified over time.

Algorithm 4 provides an example of an algorithm for determining variations in the browser or operating system (OS) used when a cloud application is accessed. Z-Scores may be calculated using a feature vector that represents a count of the number of different browsers or operating systems used when accessing a cloud application, where the accesses occurred over various time periods. Periods of one week, four weeks, and eight weeks are used below, as an example:

$$L1ZScore = \frac{\{Browser, OS\} \text{ counts past } 24hrs - 1WkAvg(\{Browser, OS\} \text{ counts per day})}{1WkStddev(\{Browser, OS\} \text{ counts per day})}$$

$$L2ZScore = \frac{\{Browser, OS\} \text{ counts past } 24hrs - 4WkAvg(\{Browser, OS\} \text{ counts per day})}{4WkStddev(\{Browser, OS\} \text{ counts per day})}$$

$$L3ZScore = \frac{\{Browser, OS\} \text{ counts past } 24hrs - 8WkAvg(\{Browser, OS\} \text{ counts per day})}{8WkStddev(\{Browser, OS\} \text{ counts per day})}$$

The Z-scores may be combined with weights (w1 ... w3) assigned to each score, as follows:

L Combined=(w1×L1ZScore)+(w2×L2ZScore)+(w3× L3ZScore)

In various examples, default baselines can be initially applied, and as time progresses, the weights can be varied as more data becomes available. An anomaly condition in the variation in login IP addresses may be defined as L_Combined>T where T is a threshold. The threshold can be determined from previous data and/or can be modified over time.

Algorithm 5 provides an example of an algorithm for determining variations in the number of downloads from a cloud application. Z-Scores may be calculated using a feature vector representing a count of the number of downloads for a user account over various time periods, such as one week, four weeks, and eight weeks, as provided in the following example:

$$L1ZScore = \frac{\text{Download counts past } 24hrs - 1WkAvg(\text{Download ounts per day})}{1WkStddev(\text{Download counts per day})}$$

$$L2ZScore = \frac{\text{Download counts past } 24hrs - 4WkAvg(\text{Download ounts per day})}{4WkStddev(\text{Download counts per day})}$$

$$L3ZScore = \frac{\text{Download counts past } 24hrs - 8WkAvg(\text{Download ounts per day})}{8WkStddev(\text{Download counts per day})}$$

The Z-scores may be combined with weights (w1 ... w3) assigned to each score, as follows:

L Combined=(w1×L1ZScore)+(w2×L2ZScore)+(w3× L3ZScore)

In various examples, default baselines can be initially applied, and as time progresses, the weights can be varied as more data becomes available. An anomaly condition in the variation in login IP addresses may be defined as L_Combined>T where T is a threshold. The threshold can be determined from previous data and/or can be modified over time.

In various examples, scores such as those illustrated above, as well as other indicators, can be used to compute a risk score, which is also referred to herein as a measure of security. In various examples, the threat detection engine 302 can compute a risk score for a user, a group or category of users, a service, and/or a service provider. A risk score can indicate a degree of security risk. For example, a scale from one to five can be defined, where a higher value indicates that a user or a service poses a higher security risk for an organization.

Indicators used to compute a risk score can provide a particular risk factor, also in the form of a score. For example, an outcome of anomaly detection can include an indicator in the form of a score that indicates a degree of deviation from the norm and/or a degree of risk the anomaly poses to the organization. In some examples, each anomaly associated with the same user or the same service can be used as a separate indicator. In various examples, other indicators that can be used to compute a risk score can be associated with a user, a service, a service provider, a geolocation where the user appears to be located, a domain where the user appears to be located, a time of day or day of the week or time of the year, or another factor. An indicator for a user can be obtained, for example, from the organization with which the user is associated, from a reputation site, from social media sites, from news organizations, or from another source. An indicator for a service or service provider can be obtained, for example, from threat intelligence aggregators or distributors, who may track the reputation of a service or service provider. Other indicators may be provided by internal threat intelligence data 314.

In various examples, a risk score can be computed as a weighted sum of the available indicators. For example, given indicators "$I_1, I_2, \ldots, I_n$" a risk score can be computed using the equation:

$$\text{risk score} = \frac{I_1 W_1 + I_2 W_s + \ldots + I_n W_n}{W_1 + W_2 + \ldots + W_n}$$

In the preceding equation, "$W_1, W_2, \ldots W_n$" are weights. In various examples, a weight value can indicate the relative importance of an indicator, with less important indicators receiving a lower weight value.

In some examples, the analytics engine 300 may obtain feedback on the validity and/or accuracy of a risk score. As an example, network administrators of an organization can provide feedback. As another example, administrators of the security management and control system can provide feedback. Alternatively or additionally, in some examples, feedback can be obtained using automated machine learning algorithms, such as decision trees and neural networks. In some examples, the analytics engine 300 can adjust weights, indicators, and/or sources using the feedback, including possibly removing sources or indicators. In these and other examples, the threat detection engine 302 can compute a new risk score with the adjusted indicators and weights.

In various examples, the threat detection engine 302 can perform regression analysis on each indicator used to compute a risk score, and/or on the risk score. Regression analysis may include building and updating a linear regression model. A linear regression model may provide output such as $S=c_1(I_1)+c_2(I_2)+ \ldots +c_n(I_n)$. The coefficients $c_i$ computed by the regression model could be new or modified weights that would replace the initial weights for computing the risk score. The model can provide greater accuracy as more feedback and more data is collected.

In various examples, the analytics engine 300 can perform various other analytics 306 on the activity data 310 obtained from service providers. In some examples, various types of algorithms can be particularly useful for analyzing the data. Decision tree, time series, naive Bayes analysis, and techniques used to build user behavior profiles are examples of machine learning techniques that can be used to generate predictions based on patterns of suspicious activity and/or external data feeds. Techniques such as clustering can be used to detect outliers and anomalous activity. For example, a threat can be identified based on an account accessing one or more files or failing a series of login attempts from an IP address that is flagged (by a third party feed or otherwise) as malicious. In a similar way, a threat can also be based on different patterns of activity with one cloud application or across multiple cloud applications, possibly over time.

One class of analytics that may be generated is descriptive or statistical analytics. Statistical data can be generated using a pre-defined set of system queries, such as, for example, MapReduce jobs and Spark and Apache Hive queries, among others. Descriptive analytics can be generated either for a single service or across multiple services using correlation techniques. Examples of reports that can be generated include, for example, login statistics (e.g., users with the most failed logins, IP address-based login history including consideration of IP reputation, geolocation, and other factors), user statistics (e.g., users with the most resources [files, EC2 machines, etc.], entitlements across clouds, number of changed passwords, and so on), activity statistics (e.g., activity of a user across clouds), statistics on key rotation (e.g., whether SSH keys have been rotated within the last thirty days, and so on), and resource statistics (e.g., number of folders, files downloaded by users, files downloaded by roaming or mobile users, and so on), among others. Various statistical analysis techniques can be used, such as mean, standard deviation, regression, sample size determination, and hypothesis testing, among others. Trends may be identified, such as login activity within a certain time period, password related support issues based on past history of such issues, or identifying types of mobile devices which see the most activity within a certain time period. Data in a report can be displayed on a user interface as an event viewer showing a "wall" of events along with actions that a user can take in response to or to remediate an event. Alerts can be constructed based on pre-defined rules that can include specific events and thresholds.

Another class of analytics that can be generated is predictive and heuristic analytics. These may incorporate machine learning algorithms to generate threat models, such as, for example, deviations from base line expectations, rare and infrequent events, and behavior analytics to derive suspicious behavior of a user, among others. Algorithms and profiles can be trained to intelligently predict whether an unusual behavior is a security risk. Third-party feeds from providers such as, but not limited to, MaxMind, FireEye, Qualys, Mandiant, AlienVault, and Norse STIX can be integrated to augment the threat intelligence. These third-party feeds can provide external information about and relating to potential security threats such as, for example, IP address reputation, malware, identification of infected node points, vulnerable web browser versions, use of proxy or Virtual Private Network (VPN) server by a user, and known attacks on clouds. In some examples, threat information is expressed in the Structured Threat Information eXpression (STIX) data format. For example, one or more services may contribute information concerning a particular IP address, such as a reputation (e.g., known for having software vulnerabilities, a host of malicious software, or source of attacks) and/or a geographic location associated with the IP address. This information can be combined with retrieved activity data involving the IP address, such as what time logins were attempted from that IP address, and information derived from activity data, such as how far apart the logins attempts were. These factors can be used to determine a "login velocity" metric. Metrics can be determined for other activities such as file accesses, sales transactions, or instances of virtual machines.

Clustering and regression algorithms can be used to categorize data and find common patterns. For example, a clustering algorithm can put data into clusters by aggregating all entries of users logging in from a mobile device. Predictive analytics can also include identifying threats based on activity such as a user not accessing a particular cloud application in several months and then showing high activity in the next month or a user downloading one file every week for the past several weeks, demonstrating a potential advanced persistent threat (APT) scenario. In some examples, data collected over time is used to build models of normal behavior (e.g., patterns of events and activity) and flag behavior that deviates from normal as abnormal behavior. After one or more flagged events or activities is characterized as a true or false positive (e.g., by user feedback), the information can be provided back to one or more machine learning algorithms to automatically modify parameters of the system. Thus, machine learning algorithms can be utilized in at least the ways discussed above to make recommendations and reduce false alarms (false positives). Activity data collected from various parameters over a period of time can be used with machine learning algorithms to generate patterns referred to as user behavior profiles. The activity data can include contextual information such as IP address and geographic location.

In various implementations, an algorithm can simulate normal user activities using previously acquired user activity data. For example, the tenant base lines 317 can include records of users' past use of a cloud service. The simulation can be used to train other machine learning algorithms to learn the normal behavior of an organization's users. In general, a particular security issue may not always repeat, and hence may not be detected by a purely supervised algorithm. However, techniques such as outlier detection can establish a baseline that is useful for detecting anomalous activities. Such anomalous activities along with contextual threat intelligence can provide more accurate prediction of threats with low prediction errors.

In various implementations, the other analytics 306 can include detection of security controls drift, which can refer to the changing of one or more security controls in a seemingly arbitrary manner, which can increase security risks. In some examples, a risk event can be generated in response to the change in a security control of a cloud service, as well as actionable intelligence associated with the risk event. Threats can include activity, events, or security controls that are abnormal or noncompliant with respect to use of an application. As an example, a tenant's password policy in a cloud application may have been changed to impose fewer requirements (e.g., type and/or number of characters). This may generate a risk event and alert to recommend that the password policy be changed back to the original password policy.

In various implementations, the analytics engine 300 can include a recommendation engine 308 that receives the output of the threat detection engine 302, the behavioral analytics engine 304, and the other analytics 306. In various examples, the recommendation engine 308 can raise alerts 322, make recommendations 324, automatically perform actions 326, and provide visualizations 328 that an organization can use to understand the organization's use of a cloud service, detected security risks, and remediation of the security risks, among other things.

In various examples, alerts 322 can be provided in visualizations 328 that can be viewed using a user interface that is accessible to an organization. Alternatively or additionally, alerts 322 can be provided through other communication channels, such as email, text messages, Short Message Service (SMS) messages, voicemail, or another communication method. In some examples, alerts 322 can be communicated as secure messages (e.g., over a secure communication channel or requiring a key or login credentials to view).

An alert can include information about a detected event such as, for example, an event identifier, a date, a time, a risk level, an event category, a user account and/or security controls associated with the event, a service associated with the event, a description of the event, a remediation type (e.g., manual or automatic), and/or an event status (e.g., open, closed) among other information. Information in an alert about each risk event can include, for example, an identifier for the affected cloud service or instance a category, a priority, a date and time, a description, a recommended remediation type, and/or a status, among other information. A risk event may also have a user-selectable action, such as editing, deleting, marking status complete, and/or performing a remediation action. Selection of a remediation action may invoke an application such as the incident remediation application and/or cloud seeder application to perform the selected remediation. An alert and/or other information concerning an identified threat can be sent to an entity external to security monitoring and control system.

In some examples, counts of events in different event categories over time can be provided as a graphical visualization, such as a chart. The chart may display, for example, a count of events by date in each of the color coded categories such as activities at an unusual time, after-hours downloads, failed logins, etc. The visual representation (e.g., a line) of an event category can be toggled on and off. In some examples, threats can also be displayed in a summary view.

In some examples, when the network administrators of an organization receive alerts 322, the network administrators may take remediation actions from within the organization's network. In these examples, the security management and control system may maintain an alert in an "open" state until the network administrators repot that the alert can be closed.

In various examples, the recommendation engine 308 can also determine recommendations 324 when the threat detection engine 302 or the other analytics 306 flag an event that requires attention. A recommendation can include, actions that can be taken to further investigate a suspicious event or to remediate (e.g., take corrective actions against) a suspicious event. In various examples, recommendations 324 can be presented to network administrators of an organization in visualizations 328, presented in a user interface. Alternatively or additionally, the recommendations 324 can be presented through other forms of communication, such as email, text messages, SMS messages, voicemails, and so on. In various examples, the network administrators of the organization can choose to activate a recommended action, which can cause the security management and control system to perform the actions.

In various examples, the recommendation engine 308 can use association rule learning can to generate recommendations. In some examples, the recommendation engine 308 can use profile linking algorithms to link activities across multiple cloud applications by finding cross-service correlation. A single user can be identified across multiple cloud service using one or more attributes or identification factors, such as a primary user identifier that is commonly used across the clouds or a single sign-on (SSO) authentication mechanism (e.g., Active Directory, Okta, etc.). Examples of correlation of activities across applications find a user logged into two cloud services simultaneously from different IP addresses, find a user who performs several failed login attempts and subsequently changes the user's password, and users who frequently have with numerous failed logins for two or more cloud services, among other examples.

In various examples, the recommendation engine 308 can also determine actions 326, including remediation actions, which the security management and control system will automatically perform. In various examples, the organization can configure to automatically perform remediation actions when the analytics engine 300 detects certain security events. Examples of remediation actions include deactivating an account, resetting a password, or setting stronger security controls, among others. In these and other examples, the remediation actions may include modifying a security setting of a service affected by the security incident, or of another service. In the latter case, the analytics engine 300 may determine that the other service may be affected, or should otherwise be secured when the security incident is detected.

In some examples, an organization may use a third-party incident management automation systems such as, for example, ServiceNow or IBM QRadar, among others. In these examples, the security management and control system may be able to interface with the third-party incident management system to remediate security incidents. For example, the incident management systems may have an API through which the security management and control system can interact with the incident management systems. In this and other examples, an action determined by the recommendation engine 308 can include sending an alert and/or other information about a security incident to an incident management system, which can track and possibly also remediate the incident. The incident management system may return a status to the security management and control system (e.g., complete or not complete). In this way, remediation may be delegated to an external system with the results reported back to the security management and control system to "close the loop." For example, if a password reset is desired for a user account, an action can include sending an alert or message to an organization's internal Information Technology (IT) system managing the user account. An administrator or system may complete the password reset operation and report the status as completed back to the cloud security system.

Autonomous Monitoring System

In various implementations, the security monitoring and control system may include an autonomous monitoring system. In various examples, the autonomous monitoring system may use an ensemble of knowledge-based security best practices, feedback from tenants, and machine-learning-driven algorithms to automatically tune and recommend adjustments to policies and security controls, as well as to detect potential security threats in users' use of a cloud service.

In some embodiments, the monitoring system may maintain an audit trail log that includes events that are detected in the cloud system. Each time an event is detected by the system, a corresponding event can be logged in the audit trail log. For example, if a user sends an email through the cloud system, an event may be recorded that includes the details of the transmission. An event in the audit trail log may include a number of different parameters. In some embodiments, an event in the audit trail log may include a timestamp indicating the date and time of the event. The event may also include an action performed by the event, such as sending an email, creating a new directory, opening a document, requesting a file transfer, and so forth. The events in the audit trail log may further include a resource representing an entity on which the action was performed, such as a computer system, a document, an email server, a file system, and/or any other resource. The event in the audit trail log may also include a subject representing the user or entity who performed the action on the resource, including a user ID, a client device ID, and organizational ID, a username, and/or any other information that may identify a user and/or an entity. The events in the audit trail log may also include additional contextual information, such as a network address, a geolocation, a user role, security authorizations, other users involved in the event, and/or any other information that may be descriptive or related to the event.

In various examples, the parameters for each event can be combined with the knowledge base and detection algorithms to provide autonomous techniques for monitoring policies, security controls and threats. For example, an event attributed to a particular user ID may use the user ID to reference additional information in the knowledge base related to the event type, the user, security credentials for the user, and so forth. Therefore, the knowledge base may be used to augment information received by the audit trail log to generate a complete picture of all the details surrounding a particular event.

In various examples, different models can be developed from users' activities in using a cloud service. These activities may be monitored in real time and/or by analyzing the audit trail log described above. For example, some embodiments may generate user-specific models for the users associated with a particular tenant. User specific models may be applied to a particular user ID to describe the model behavior of that particular user. Some embodiments may also generate cloud-service-specific models that encompass use of the cloud service by all users across various tenants. Additionally, some embodiments may also generate tenant-specific models that model usage by all users assigned to a particular tenant (e.g. for all the tenant's users). There are many techniques for developing models for a particular user that are used by various embodiments. In some of the examples described below, these techniques may also be used to develop a model for the tenant by considering all the activity data for the users of the tenant.

in some embodiments, the actions performed by a user, U, may be determined from activity data obtained from the cloud service provider. For example, the cloud service provider may provide at least a portion of the audit trail log described above. Activity data for a particular user may be extracted from the audit trail log is a list of events. In the activity data, the user may have been found to have performed a series of actions, S. These actions may be extracted from the parameters of the event in the audit trail log. The different actions that make up the series can be characterized as a set of vertices $(v_1 \ldots v_n)$ using the following notation:

$$S = \{v_1, v_2, v_3 \ldots v_n\}$$

For a time period $(t_1, t_2)$, having a start time $t_1$ and an end time $t_2$, each action $(v \in S)$ nay be mapped to a vertex. Further, the number of times each action was performed can be assigned as a weight $w_v$ to each the vertex v. The weight of the vertex $w_v$ may be thought of as specifying a size of the vertex. Additionally, the number of times one action is followed by another action can be represented as an edge weight $w_e$. For example, when one action $v_1$ is followed repeatedly by a second action $v_2$, the edge weight $w_e$ assigned to the edge between these two vertices may be increased. Additionally, any contextual properties of each action (e.g., a network address, a geolocation, a date and time, etc.) can be represented as a subgraph of each vertex v.

Figure 4:
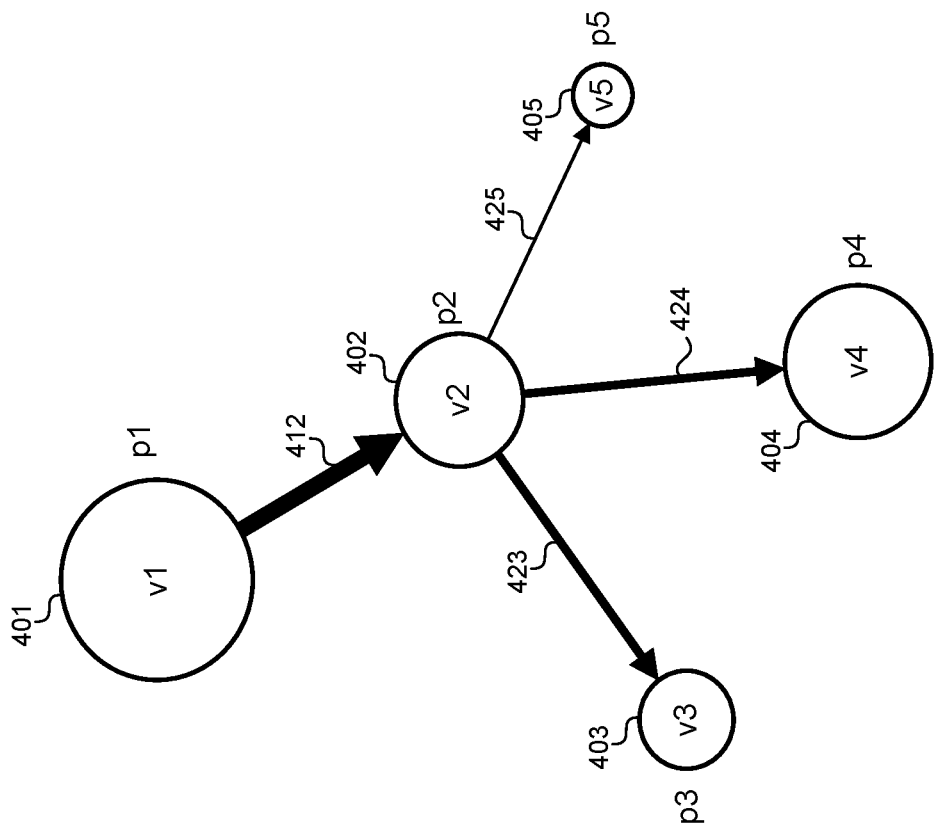
FIG. 4 illustrates a weighted directed graph representing the series of actions with assigned weights, according to some embodiments.

FIG. 4 illustrates a weighted directed graph representing the series of actions with assigned weights, according to some embodiments. The series of actions, with these assigned weight values, can then be represented in a weighted directed graph, by connecting the vertices representing actions using the sequence in which the actions occur in the log. In this example a first action may be represented by a first vertex 401. A second action may be represented by a second vertex 402. When the first action is followed sequentially by the second action in the event log, the first vertex may be connected to the second vertex through an edge in the graph. Similarly, a third action may be represented by a third vertex 403, a fourth action may be represented as a fourth vertex 404, and a fifth action may be represented as a fifth vertex 405. Each of these actions may be sequentially connected in the directed graph to represent a sequential execution of these actions. For example, the edge connecting the second vertex 402 to the third vertex or hundred and three represents the action of the third vertex 403 being executed after the action of the second vertex 402. The same may be true of the edge connections between the second vertex 402 and the fourth vertex 404, as well as the connection between the second vertex 402 and the fifth vertex 405.

The visual size of each of the vertices for one, 402, 403, 404, 405 may indicate the corresponding frequency with which the associated action is executed. For example, the first action may have been executed more than the second action, and consequently the size of the first vertex 401 is larger than the size of the second vertex 402. Similarly, the second action may have been executed more times than the fifth action, and consequently the size of the second vertex 402 may be larger than the size of the fifth vertex 405.

Additionally, the size or thickness of each of the edges in the directed graph may represent a frequency with which one action follows the other action. For example, the directed edge 412 between the first vertex 401 and the second vertex 402 is very thick, indicating that the second action is often performed after the first action. In contrast, the directed edge 425 between the second vertex 402 and the fifth vertex 405 is relatively thin compared to the directed edge 412 described above. This may indicate that the fifth action is not carried out after the second action very often, at least compared to the third action in the fourth action which have thicker edges 423, 424.

The weighted directed graph of FIG. 4 may be represented using the following notation, where P represents the contextual parameters, G represents the graph, E represents the edges between vertices, and V represents the vertices described above.

$$G=(V,E)$$

$$V=\{v_1,v_2,v_3,\ldots v_n\}$$

$$E=\{(v_1v_2),(v_2v_3),\ldots (v_mv_n)\}$$

$$P=\{p_1,p_2,p_3,\ldots p_n\}$$

In various examples, the security monitoring and control system can use graphs generated as in the example of FIG. 4 to perform autonomous security control monitoring. In various examples, the system can monitor the security settings of cloud services via a security control. Cloud service security settings may be managed by administrators and any change can affect the security posture of the system. In various examples, the security monitoring and control system can examine the security posture of the cloud service by examining various system configuration parameters. The security monitoring and control system can further recommend a suitable baseline to be used for monitoring. When a change to the configuration parameters occurs, the security monitoring and control system can an generate an alert and suggest a recommendation for addressing the change. In some situations, such as when authorized by the tenant, the system can address the change automatically.

In some embodiments, security-control-change-related activities can be monitored using the events graph model in FIG. 4. For example, each security control check can be represented as a graph vertex in the graph 400. First, each security control check may be represented as a graph vertex. When an activity event for a security control indicates a change, and the change is against the security best practices, the system can generate a recommendation to turn on the security control monitoring. When some security controls violations are detected frequently, then configuration monitoring that detects these violations can be excluded to reduce noise. The frequent violations can be detected by keeping an event graph model of the security control for various time periods.

In various examples, the security monitoring and control system can use graphs such as the graph illustrated in FIG. 4 to perform autonomous policy monitoring. In some examples, a predefined set of policies can be automatically applied to bootstrap a tenant whenever the tenant registers a cloud services with the security monitoring and control system. In some examples, additional policies can be added for the tenant automatically on an ongoing basis, where these additional policies can be for detecting risky events. New policies can be added, for example, as new threat scenarios are identified by the operations of the security management and control system. In various examples, tenants can also add new policies, and these policies can be tuned similarly.

Policies used to bootstrap a tenant may be generic in nature and may generate excessive alerts depending on the usage of cloud service. An automated approach is described below that can be used to automatically tune these policies and reduce false positive alerts from the system.

In various examples, as users perform various activities in the cloud application, each activity can be recorded and stored as an audit event. Sequences of events can then be mapped to a graph, for example starting from a service's entry point (e.g. a login) through various actions that can be taken using the service (e.g., reading pages, modifying pages, etc.), and to an end point of the user's activity (e.g. user logout). The sequence of events can include events for a given time window (e.g., one day), and can be used to generate a graph such as is illustrated in FIG. 4.

In various examples, the tracking of events as a graph enables the security monitoring and control system to track a sequence of actions performed (e.g. login with impersonation privilege—create user—assign admin role—logout) as opposed to individual actions (e.g. assign admin role). This ability to correlate with previous and next actions can provide the desired context, and thus allowing alerts with contexts (i.e. if-then-alert-else-skip context).

In various examples, the graph model may be used to tune polices. For example, policies can be used to define conditions that, when met, trigger a risk alert. Managed policies can be non-specific to a tenant, and thus can be provided to rapidly enable common monitoring use cases. Activity data for a tenant can then be used to tune the managed policies to better suit the tenant. For example, when a pattern in the tenant's event graph model matches conditions of one or more managed policies, then a recommendation can be generated to turn on the matching policies. In various examples, the recommendation can include a suggestion for how to tune the policies appropriately to include additional contextual properties.

In various examples, the graph model can be used to tune policies to optimize risk events generation. For example, generated risk event alerts based on existing policies can be analyzed (using $w_e$ and $w_v$) to determine whether these alerts are being triggered too often, which may indicate that these events are normal rather than exceptional. When a tenant confirms that these events are benign and expected, then corresponding policies responsible for generating risk event alerts can be analyzed, and associated policy conditions can be used to find matching pattern in the customer event graph model. From the graph model, contextual properties such as blacklisted IP addresses associated with the event actions can analyzed, and a recommendation can be made to tune the policy condition to reduce the risk alert generation.

In various examples, the graph model can further be used by the security management and control system for autonomous threat monitoring. For example, user actions over a given time period can be used to generate a directed graph as shown in FIG. 4. In various examples, multiple such directed graphs can be formed for various time periods (such as each day, each week, etc.). These graphs can then represent user's patterns of use. If a user follows a pattern every day, and an overall analysis is performed for a period of time, then weights for the edges can be established. Furthermore, any deviation, such as different patterns or numbers of occurrences, can be detected by examining recent user activities in view of the graph's vertices and edges. Any deviation can be considered an unusual scenario, in which case the security monitoring and control system can increase the risk scores for the user. The security monitoring and control system can further also recommend adding policies or tuning existing policies to generate threat alerts.

For example, as noted above, policy monitoring can result in too many risk events being detected for a given resources. In these examples, a factored graph comprising of latent factors that guide the security implication of the traversed path can be used to generate a User Risk behavior threat. For example, each of the graphs G when traversed and combined with factor graphs can help determine a threat. Various examples of latent factors include: $W_e$ being exceptionally large for an action v for a given actor; action v being triggered from a suspicious or blacklisted IP addresses or a different device; $W_e$ being large for an action v for a given user type; and unusual geolocations, among other examples.

As another example, the graphs can be used to determine historical patterns or impressions. For example, a graph pattern may show a similarity with known security problems. As another example, a graph pattern may show anomalies compared to historical patterns. While the policy checking is based on finite set of rules and variates, user behavior anomaly checking can be computed based on probabilistic modeling of the same rules and historical patterns that can be used to determine a deviation from the norm.

As another example, the graphs can be used to determine deviations from a user profile. In these examples, the system can generate each user's fingerprint by plotting a graph based on the actions taken over a period time such as a day. The graph can then be superimposed on data for subsequent days to find deviations in terms of the latent factors, such as deviation in actions v performed; $W_e$ or $W_v$ variations; and/or the deviations in ($p_1, p_2, \ldots p_3$) contextual parameters (e.g., IP address used, devices used, etc.).

Figure 5:
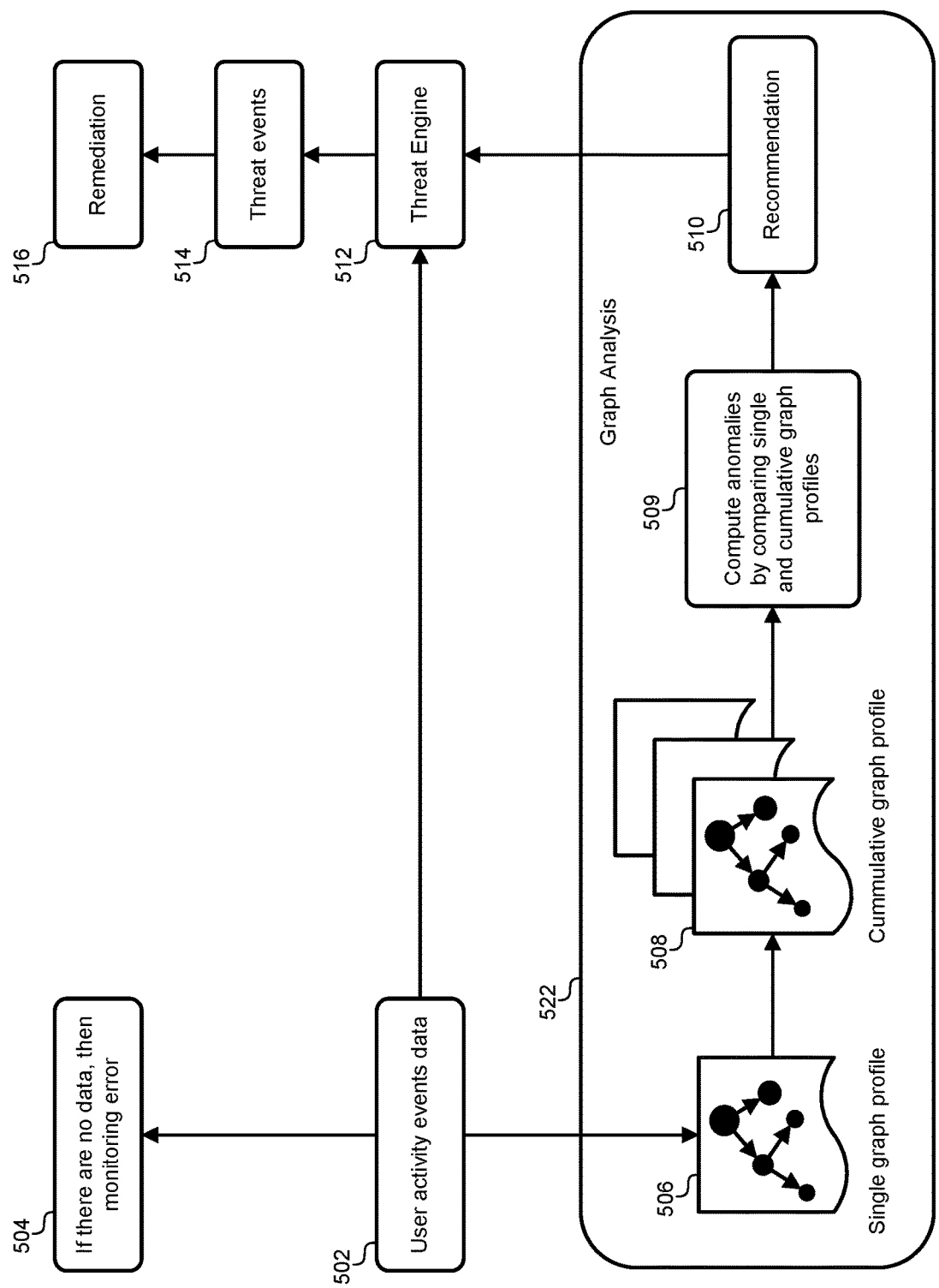
FIG. 5 illustrates a flowchart of a method for monitoring threats using directed graphs representing user actions, according to some embodiments.

FIG. 5 illustrates a flowchart of a method for monitoring threats using directed graphs representing user actions, according to some embodiments. In various examples, the security monitoring and control system can implement this method to detect user anomalies and to remediate security threats. The system can, for example, generate a graph profile for each user for a time window (e.g., one day, one week, etc.) for all the actions performed by the user, as well as associated parameters such as time stamps, resources affected, IP addresses used, geolocations, etc. As described above, the size of a vertex in the graph may represent the number of actions performed. The edge connectivity line direction indicates the path the user followed when performing the action. Each vertex may have a certain set of parameters for the associated events, such as resources affected, IP addresses used, time of the day used, etc. The system can then superimpose a graph of more recent data over a historical graph profile of the same user. Using the cumulative superimposed graph, the system can detect anomalies if the current single graph profile of the user deviates from the historical cumulative graph. Any such deviation can be considered as anomalous, and a risk score can be increased for the user. Based on the deviations, the threat engine can generate threat event and possibly also remediate the threat.

The method may include monitoring user activity and event data from a log (702). As described above, and audit log may track each of the events executed by a user in the cloud environment. As each of these actions occur, they may be logged as an event in the audit log. The audit log may be provided to the system, and the system may parse the audit log to identify actions associated with a particular user ID. These actions may be extracted such that a list of actions within a defined time interval for a particular user may be assembled and used to generate a graph.

In the rare case where there is no event data for a particular user in the audit log, then the method may include generate a monitoring error (704). This error may be ignored if the user is new in the system and a history of actions has not yet been established. In some embodiments, starting data from a similar user may be copied into the event log for the current user. To provide starting data, the actions of a similar user (e.g., same employee role, same security level, same geographic location, same work function, and/or other characteristics) may be used as a starting data set for the particular user until they have built up a log of actions representing their own activity.

The method may further include generating a single graph profile for the user (706). The graph may be designed as explained above, where the actions correspond to vertices, and the order of the actions are represented by connections between vertices by directed edges of the graph. The weight of the vertices may be assigned based on the number of times an action is taken, and the weight of each directed edge may also be assigned based on the number of times the edge is traversed. The graph may be formed to indicate a typical use "fingerprint" for the user in the cloud system. The pathways in the graph indicate patterns of usage along with a probability that those patterns will be traversed with each action. The graph may also include contextual parameters that are assigned to each vertex as described above.

The single graph may be generated for a limited time interval. For example, the single graph may be generated for a time interval of one day, one hour, one week, two days, and so forth. In some embodiments, the single graph may be generated for a defined activity interval. For example, the single graph may be generated for a single communication session. When a user logs in the graph may begin to be formed, and may end when the user logs out. In some embodiments, the single graph may be formed for a particular activity. This activity may span multiple discrete time intervals over days or weeks. For example, as a user logs in and bills time to a certain matter number, a graph may be formed. In another example, a single graph may be formed describing the users actions when using a particular cloud platform or application. Each time the platform or application is used by the user, additional actions and/or edges may be adjusted or added to the single graph. The single graph may represent a subset of the overall usage pattern of the user over a long interval of time and over all applications, uses, communication sessions, and so forth.

The method may also include generating a cumulative graph profile (708). The cumulative graph profile may be constructed from a historical set of actions that is longer and more extensive than the single graph profile discussed above. In some embodiments, the cumulative graph profile may be representative of all user actions on all platforms and communication sessions over time. Regardless of the particular activity, the cumulative graph profile may characterize a usage pattern for the user across all situations in the cloud environment. In some embodiments, the cumulative graph profile 708 may be generated to align with one of the dimensions of the single graph profile. For example, the cumulative graph profile may be limited to all historical uses of a particular application when the single graph profile is also limited to uses of the particular application. In another example, the cumulative graph profile may be limited to certain times of day. Usage patterns may be different at night than they are in the day, and a user may have multiple single graph profiles that cover daytime usage versus evening usage. In another example, the cumulative graph profile may be limited to a single client device. When a user logs in from one client device, the single graph profile may be limited to that device. Similarly, the cumulative graph profile may be limited to all uses historically on that same client device.

In short, any characteristic or dimension used to limit the single graph profile may also be used to limit the cumulative graph profile. This may cause the cumulative graph profile to align with the single graph profile more accurately. Having a number of cumulative graph profiles that are specific to particular characteristics or dimensions makes the system more likely to accurately detect anomalies during single uses that align with those characteristics or dimensions. For example, a user checking and sending email from home may have a quite different usage pattern represented by the graphs than they would when checking email from a work computer in their office. Instead of creating one single cumulative graph profile, the multiple graph profiles can be specifically aligned to specific activities, etc., to more accurately detect anomalies in the specific activities. However, in the simplest case, the cumulative graph profile may represent all actions taken by the user over time in the audit log.

Both the single graph profile and the cumulative graph profile may be constructed by extracting events from the audit log as described above. To construct the cumulative graph profile, the audit log may be searched for actions having particular contextual parameters, actions, user IDs, and/or any other text field or characteristic available in the audit log. The actions can then be counted to assign a weight to each action, and the edges of the graph may be assigned based on the order of actions in the audit log. When constructing the single graph profile, a similar method may be used, except the events extracted from the audit log may be limited to a particular time interval, parameter, device, and/or other limited characteristic as described above.

The method may further include detecting anomalies in the user actions by comparing the single graph profile to the cumulative graph profile (709). A number of different methods may be used for detecting differences between the single graph profile and the cumulative graph profile. In some embodiments, a first step may include identifying a sub portion of the cumulative graph profile that matches the single graph profile. In some cases, the single graph profile may only include a subset of the actions that are performed in the cumulative graph profile. Therefore, this step may identify the portion of the cumulative graph profile that best matches the single graph profile. For example, the system may traverse the cumulative graph profile to find an action that matches the first action in the single graph profile. Edges and vertices extending from that action may then be traversed to identify all vertices and/or edges that should be compared to the single graph profile. In some cases, the single graph profile in the cumulative graph profile may be sufficiently similar that no sub graph needs to be identified in the cumulative graph profile.

After identifying all or a portion of the cumulative graph profile that matches the single graph profile, a comparison may be made between the individual vertices and/or edges to detect substantial differences. In some embodiments, the system may look for individual differences in vertices and/or edge weights to detect anomalies. For example, if a single vertex in the single graph profile has a weight that is different from a corresponding weight of the vertex in the cumulative graph profile by more than a threshold amount, an anomaly may be detected. Thresholds may be set for each individual action depending on the type of action. For example, the action for sending an email may have a threshold that is quite large, allowing large differences in the number of emails that the user may send from one day to the next. However, an action representing opening a new account may have a very small threshold such that opening even a few additional counts more than normal would trigger an anomaly.

In addition to detecting differences in vertex weights, some embodiments may also detect differences in edge weights. For example, turning back to FIG. 4, a user taking the second action at vertex 402 may be expected to take the third action or the fourth action and traverse to vertex 403 and/or vertex 404 far more often than they take the fifth action to vertex 405. This is indicated by the weight of edge 423 and edge 424 being greater than the weight of edge 425. If FIG. 4 represents the cumulative graph profile, and a single graph profile included a weight on edge 425 that was significantly greater than the weight of edge 423 and/or 424, this difference may be compared to a threshold and used to detect an anomaly. Essentially, instead of detecting actions that are taken more/less than normal, this detects action patterns that are not in line with the historical usage pattern for the user.

Some embodiments may do a more holistic comparison of the single graph profile and the cumulative graph profile to detect an anomaly. For example, individual differences in the weights of vertices and/or edges may be calculated as described above. Some embodiments may require a certain number of threshold differences in vertices and/or edges before an anomaly is detected. For example, a single action that is taken more than normal would not cause an anomaly, while three actions taken more than normal along with an edge indicating an action taken out of order may be sufficient to cause an anomaly. The number of individual threshold violations may be aggregated and compared to a threshold to detect a usage anomaly for the graph as a whole.

Some embodiments may also do a holistic comparison between the graphs by aggregating differences before comparison to a threshold. For example, if each of the weights of the vertices was slightly higher than usual, the individual differences of each vertex may not be enough to violate a threshold difference requirement and trigger an anomaly. However, the aggregated differences for each of the vertices in the single graph profile may also be compared to a threshold and used to detect an anomaly. Weights for edges may also be included in this calculation. This aggregated threshold comparison may be used to detect overall differences in the usage pattern even when no individual action or action pattern is too far removed from the ordinary and historical usage pattern.

The examples above use simple difference calculations to compare the single graph profile to the cumulative graph profile. Other embodiments may use different mathematical operations to determine a difference. For example, some embodiments may use a least mean squared (LMS) calculation to perform a difference calculation between vertex weights and/or edge weights. Some embodiments may use a mean squared error (MSE) or mean squared deviation (MSD) approach to calculate deviations between the two graphs. These difference methods are presented by way of example and not meant to be limiting. Any difference method may be used depending on the needs of the particular embodiment.

The examples above also compare differences in weights between the two graphs. This is also presented only by way of example, and is not meant to be limiting. Some embodiments may calculate difference between the contextual parameters (P) for each of the vertices. For example, if an action is always associated with a particular contextual parameter in the cumulative graph profile, and the vertex in the single graph profile is absent the particular contextual parameter, then this difference may also contribute to the detection of an anomaly.

In some embodiments, any of the methods described above may be combined in any combination and without limitation. For example, some embodiments may use differences between vertex weights, edge weights, differences in contextual parameters, and so forth. Each of these differences may be aggregated or otherwise combined together to generate a combined score that can be compared to a threshold. In some embodiments, these difference measurements can be combined together in a weighted function such that some differences are weighted more heavily than others. For example, differences in vertex weights may be weighed more heavily than differences in edge weights.

Turning back to FIG. 5, the method may further include generating a recommendation (710). The recommendation may be based on the type of anomaly detected, and the recommendation may be submitted to the threat engine (712). The recommendation may be made in the form of an estimated threat type and/or severity (e.g., unauthorized access threat, severity: high). As described above for the overall cloud security system, the threat engine 712 may generate one or more threat events (714) and may also generate one or more remedial actions (716).

Figure 6:
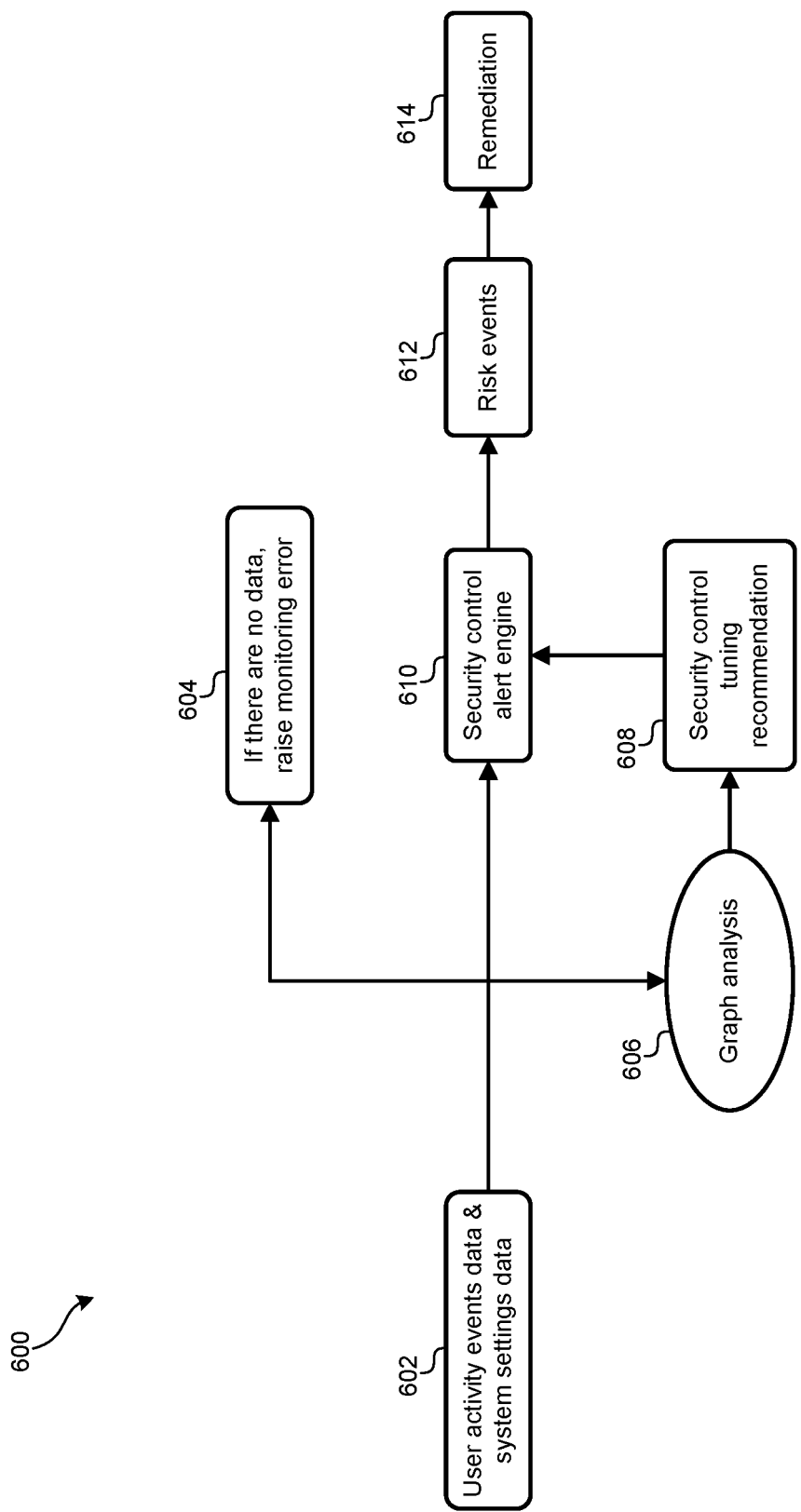
FIG. 6 illustrates flow diagram for a security monitoring and control system.

FIG. 6 illustrates flow diagram 600 for a security monitoring and control system. In various examples, the flow diagram can be implemented by the security monitoring and control system to analyze system configuration change data and available or enabled security controls ongoing basis. The system can further determine if some the configuration changes are not being monitored. The system can further determine if certain system configurations need to be monitored and a degree of importance of these configurations. The system can further recommend to tenants to enable a security control and can provide an option to apply the security control. When a tenant provided its enablement consent previously, then the system can automatically enable corresponding security controls and monitor the controls on an ongoing basis.

As described above, the method may access activity events data and system setting data using the audit log (602). If there are no data available in the log (604), then the system may wait until enough data has been built up in the log to perform an analysis and/or may raise a monitoring error or other warning flag.

After the user log is accessed, the method may perform a graph analysis 606 as described above. Instead of being limited to a single user, the graph analysis 606 may be performed for an organization, a group of users, an application, or an entire tenant. The graph analysis 606 may encompass all of the actions described above in box 522 in FIG. 5. However, instead of being limited to a single user, the single graph profile in the cumulative graph profile may be extended to the larger groups described above. The same methods described above may be used to detect differences between a single graph profile and the cumulative graph profile for the larger group. These profiles may be limited to certain dimensions and/or characteristics as described above. For example, the single graph profile and the cumulative graph profile for a tenant may be limited to users of a particular application. In another example, the profiles may be limited to a single application that is used by any user of any tenant or customer. Anomalies may be detected and threats may be generated using the same difference techniques described above.

The method may also generating a recommendation to tune the security controls for the group matching the graphs compared earlier (608). Instead of detecting a threat for a single user and taking remedial action, such as restricting the user's access and/or usage privileges, the system may adjust how the organization, tenant, application, etc., handles security threats in general. This recommendation may be passed to the security control alert engine (610) which may generate risk events (612) and take remedial actions (614).

Figure 7:
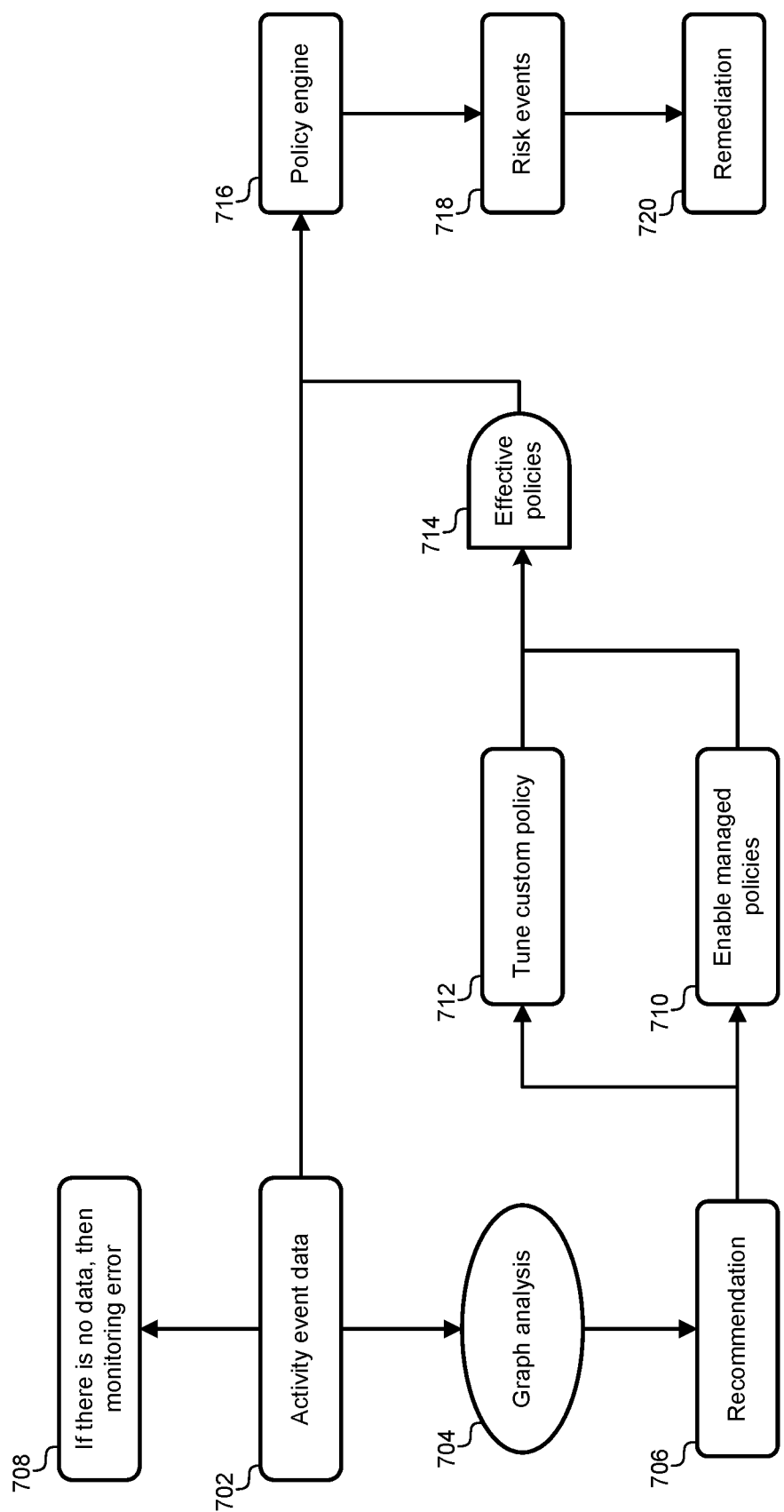
FIG. 7 illustrates a flow diagram for a security monitoring and control system.

FIG. 7 illustrates a flow diagram for a security monitoring and control system. In various examples, the flow diagram can be implemented by the security monitoring and control system to perform policy monitoring. For example, the system can analyze system activities performed by administrators and end users. The system can further check for enabled policies for the tenant. The system can further determine if some the activities are not being monitored. The system can further determine whether certain activities should be monitored and a degree of importance of these activities. The system can further recommend to tenants to enable policies and can provide an option to apply the policies. When the tenant provided enablement consent previously, then the system can automatically enable corresponding security controls and can monitor the controls on an ongoing basis. The system can further check for ongoing generated alerts. The system can determine if some of the policies are generating too many alerts or if the tenant provided feedback that some of the generated alerts are not applicable. The system can further recommend to the tenant to tune enabled policies by narrowing the scope of the policies or by disabling the policies. The system can further provide an option to apply the tuning. When a tenant provided policy tuning consent previously, then the system can automatically enable a corresponding change and can monitor the change on an ongoing basis.

As described above, the method may include monitoring and/or accessing activity event data from an audit log (702), and waiting or generating an error if there is not enough data (708). As described above, the system may perform a graph analysis as described in relation to FIG. 5. However, this graph analysis may use events taken from a log of actions carried out by the security system itself. Instead of analyzing user actions, the activity event data may describe actions taken by the security system in response to threats. The cumulative graph profile may be a historical pattern of actions taken by the security system, and the single graph profile may similarly be a pattern of actions over a smaller historical time interval. As was the case with user graph profiles, the system graph profiles may be limited to specific dimensions and/or characteristics.

When detecting differences between the cumulative graph profile and the single graph profile, this graph analysis (704) may be looking for differences in the way that the security system reacts over time. These differences may indicate that the security system itself has seen an interval of abnormal responses. This can be used to identify possible false positive and/or false negative reactions by the security system, and this information may be used to tune the security policies used by the system.

The method may also include generating a recommendation 706 for altering, adding, and/or removing security policies to a batch of policies that are used by the security system as described above. This may include tuning custom policies (712) and/or enabling other managed policies (710). These policies may be joined together (714) and passed to a policy engine 760. As described above, the policy engine may generate risk events (718) and execute remedial actions (720).

Figure 8:
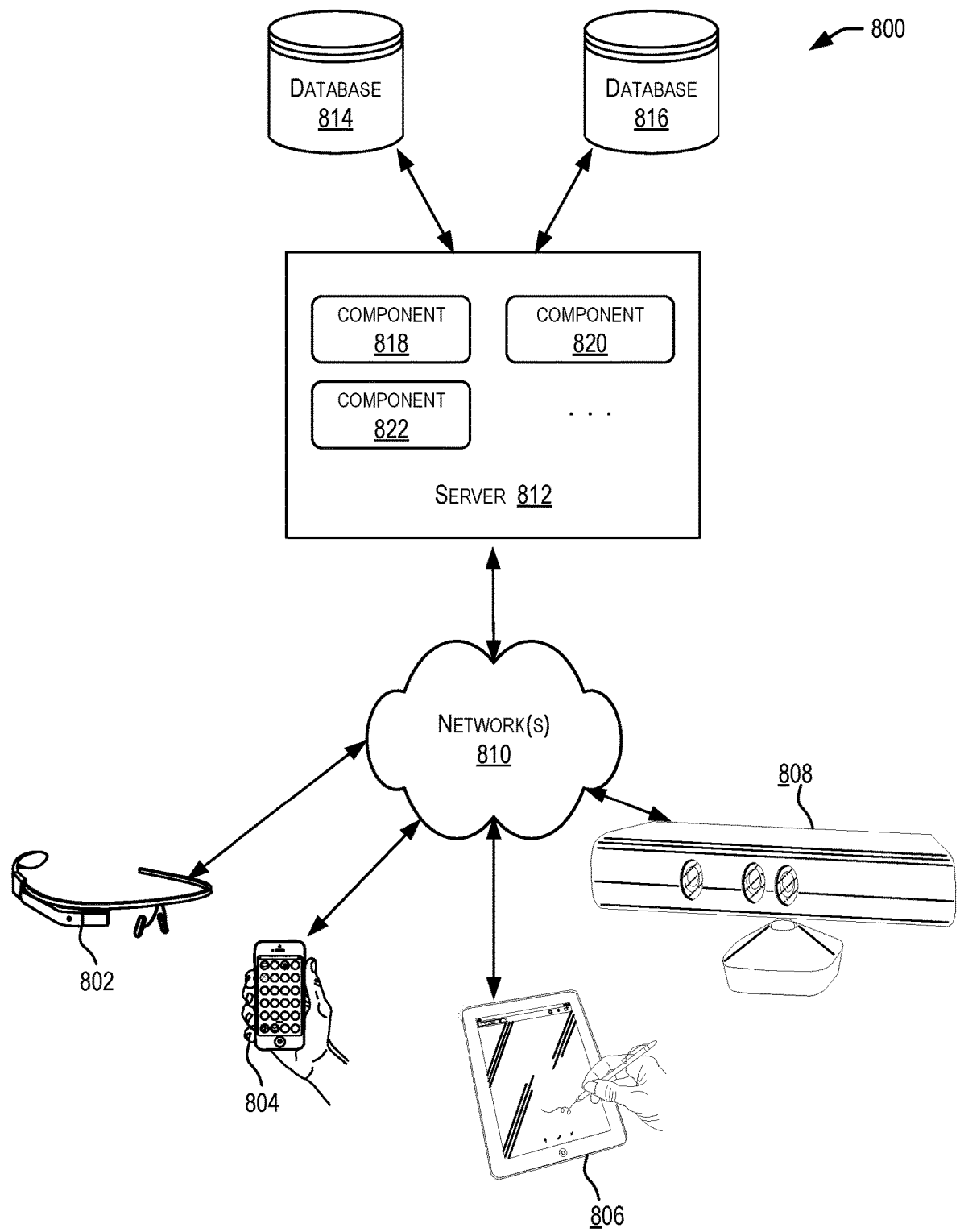
FIG. 8 depicts a simplified diagram of a distributed system in which the various examples discussed above can be implemented.

FIG. 8 depicts a simplified diagram of a distributed system 800 in which the various examples discussed above can be implemented. In the illustrated example, the distributed system 800 includes one or more client computing devices 802, 804, 806, 808, coupled to a server 812 via one or more communication networks 810. The client computing devices 802, 804, 806, 808 may be configured to run one or more applications.

In various embodiments, server 812 may be adapted to run one or more services or software applications that enable a security monitoring and control system that can autonomously monitoring threat detection and suggest configuration changes to tune the system's configuration to the needs of a particular tenant. Users may use the client computing devices 802, 804, 806, 808 to view alerts generated by the system, as well as recommendations for tuning the system's configuration.

In various examples, the server 812 may also provide other services or software application, and can include non-virtual and virtual environments. In some examples, these services may be offered as web-based or cloud services or under a Software as a Service (SaaS) model to the users of the client computing devices 802, 804, 806, 808. Users operating the client computing devices 802, 804, 806, 808 may in turn use one or more client applications to interact with the server 812 to use the services provided by these components.

In the configuration depicted in FIG. 8, the server 812 may include one or more components 818, 820, 822 that implement the functions performed by the server 812. These components may include software components that may be executed by one or more processors, hardware components, or combinations thereof. It should be appreciated that various different system configurations are possible, which may be different from the example distributed system 800.

The client computing devices 802, 804, 806, 808 may include various types of computing systems, such as portable handheld devices such as smartphones and tablets; general purpose computers such as personal computers and laptops; workstation computers; wearable devices such as a head-mounted display; gaming systems such as handheld gaming devices, gaming consoles, and Internet-enabled gaming devices; thin clients; various messaging devices; sensors and other sensing devices; and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). The client devices may be capable of executing various different applications such as various Internet-related apps, communication applications (e.g., e-mail applications, short message service (SMS) applications) and may use various communication protocols. A client device may provide an interface that enables a user of the client device to interact with the client device. The client device may also output information to the user via this interface. Although FIG. 8 depicts only four client computing devices, any number of client computing devices may be supported.

Network(s) 810 in the distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 810 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 812 can include one or more virtual machines running virtual operating systems, or other computing architectures involving virtualization, such as one or more flexible pools of logical storage devices that can be virtualized to maintain virtual storage devices for the server. In various examples, the server 812 may be adapted to run one or more services or software applications that perform the operations as described above.

The server 812 may run an operating system including any of those discussed above, as well as any commercially available server operating system. The server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include, without limitation, those commercially available from Oracle, Microsoft, Sybase, IBM (International Business Machines), and the like.

In some implementations, the server 812 may include one or more applications to analyze and consolidate data feeds and/or event updates received from users of the client computing devices 802, 804, 806, 808. As an example, data feeds and/or event updates may include, but are not limited to, Twitter® feeds, Facebook® updates or real-time updates received from one or more third-party information sources and continuous data streams, which may include real-time events related to sensor data applications, financial tickers, network performance measuring tools (e.g., network monitoring and traffic management applications), clickstream analysis tools, automobile traffic monitoring, and the like. The server 812 may also include one or more applications to display the data feeds and/or real-time events via one or more display devices of the client computing devices 802, 804, 806, 808.

The distributed system 800 may also include one or more data repositories 814, 816. These data repositories may provide a mechanism for storing information various types of information, such as the information described by the various examples discussed above. The data repositories 814, 816 may reside in a variety of locations. For example, a data repository used by the server 812 may be local to server 812 or may be remote from server 812 and in communication with server 812 via a network-based or dedicated connection. The data repositories 814, 816 may be of different types. In some examples, a data repository used by the server 812 may be a database, for example, a relational database, such as databases provided by Oracle Corporation® and other vendors. One or more of these databases may be adapted to enable storage, update, and retrieval of data to and from the database in response to SQL-formatted commands.

In some examples, one or more of the data repositories 814, 816 may also be used by applications to store application data. The data repositories used by applications may be of different types such as, for example, a key-value store repository, an object store repository, or a general storage repository supported by a file system.

Figure 9:
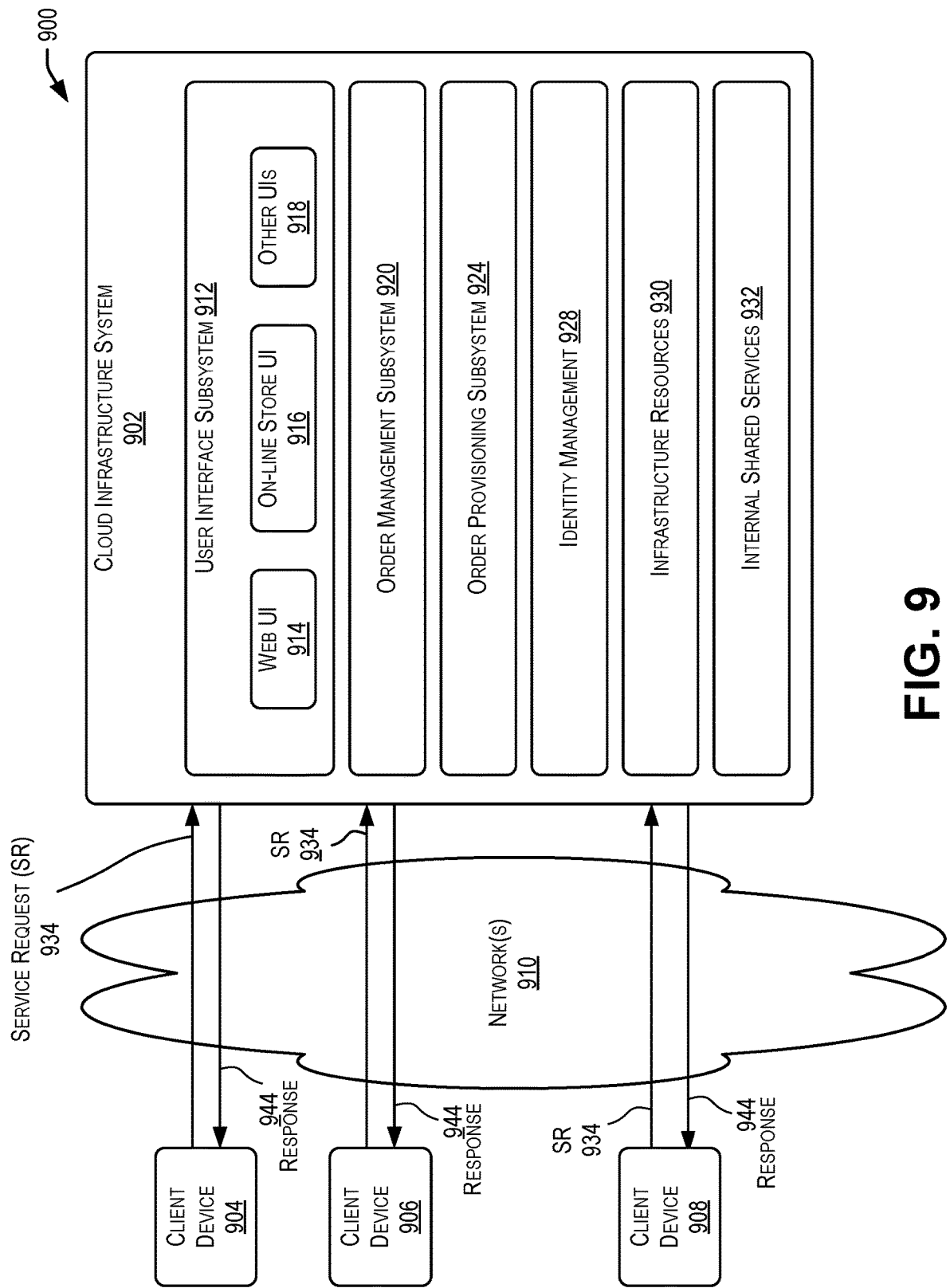
FIG. 9 is a simplified block diagram of one or more components of a system environment in which services may be offered as a cloud.

In some examples, a cloud environment may provide one or more services such as those discussed above. FIG. 9 is a simplified block diagram of one or more components of a system environment 900 in which these and other services can be offered as cloud services. In the example illustrated in in FIG. 9, a cloud infrastructure system 902 may provide one or more cloud services that may be requested by users using one or more client computing devices 904, 906, and 908. The cloud infrastructure system 902 may include one or more computers and/or servers that may include those described above for server 812 of FIG. 8. The computers in cloud infrastructure system 902 of FIG. 9 may be organized as general purpose computers, specialized server computers, server farms, server clusters, or any other appropriate arrangement and/or combination.

Network(s) 910 may facilitate communication and exchange of data between the clients 904, 906, 908 and the cloud infrastructure system 902. The network(s) 910 may include one or more networks. The networks may be of the same or different types. The network(s) 910 may support one or more communication protocols, including wired and/or wireless protocols, for facilitating the communications.

The example depicted in FIG. 9 is only one example of a cloud infrastructure system and is not intended to be limiting. It should be appreciated that, in other examples, the cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in other examples.

The term cloud service is generally used to refer to a service that is made available to users on demand and via a communication network such as the Internet by systems (e.g., the cloud infrastructure system 902) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand and self-service, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In various examples, the cloud infrastructure system 902 may provide one or more cloud services using different models, such as under a Software as a Service (SaaS) model, a Platform as a Service (PaaS) model, an Infrastructure as a Service (IaaS) model, and others, including hybrid service models. The cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by the cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

In some examples, resources in the cloud infrastructure system 902 may be shared by multiple users and dynamically re-allocated per demand. Additionally, resources may be allocated to users in different time zones. For example, the cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

The cloud infrastructure system 902 may provide the cloud services via different deployment models. In a public cloud model, the cloud infrastructure system 902 may be owned by a third party cloud services provider and the cloud services are offered to any general public customer, where the customer can be an individual or an enterprise. In certain other embodiments, under a private cloud model, the cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 902 and the services provided may be shared by several organizations in a related community. Various other models such as hybrids of the above mentioned models may also be used.

The client computing devices 904, 906, 908 may be devices similar to those described above for the client computing devices 802, 804, 806, 808 of FIG. 8. The client computing devices 904, 906, 908 of FIG. 9 may be configured to operate a client application such as a web browser, a proprietary client application (e.g., Oracle Forms), or some other application, which may be used by a user of the client computing device to interact with the cloud infrastructure system 902 to use services provided by the cloud infrastructure system 902.

In various examples, the cloud infrastructure system 902 may also provide "big data" and related computation and analysis services. The term "big data" is generally used to refer to extremely large data sets that can be stored and manipulated by analysts and researchers to visualize large amounts of data, detect trends, and/or otherwise interact with the data. The analysis the cloud infrastructure system 902 can perform may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are used for facilitating the provision of various cloud services offered by cloud infrastructure system 902. Infrastructure resources 930 may include, for example, processing resources, storage or memory resources, networking resources, and the like.

In some examples, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In some examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

The cloud infrastructure system 902 may itself internally use the services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various examples, the cloud infrastructure system 902 may include multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. The user interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to. For example, a customer may place a subscription order for services such as those discussed above. As part of the order, the customer may provide information identifying the amount of resources the customer needs and/or for what time frame, among other things.

In some examples, such as the example depicted in FIG. 9, the cloud infrastructure system 902 may include an order management subsystem (OMS) 920 that is configured to process the new order. As part of this processing, OMS 920 may be configured to: generate an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning, among other operations.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

The cloud infrastructure system 902 may send a response or notification 944 to the requesting customer to indicate when the requested service is now ready for use. In some instances, information (e.g., a link) may be sent to the customer that enables the customer to start using and availing the benefits of the requested services.

The cloud infrastructure system 902 may provide services to multiple customers. For each customer, the cloud infrastructure system 902 is responsible for managing information related to one or more subscription orders received from the customer, maintaining customer data related to the orders, and providing the requested services to the customer. The cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

The cloud infrastructure system 902 may provide services to multiple customers in parallel. The cloud infrastructure system 902 may store information for these customers, including possibly proprietary information. In some examples, the cloud infrastructure system 902 includes an identity management subsystem (IMS) 928 that is configured to manage customers information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
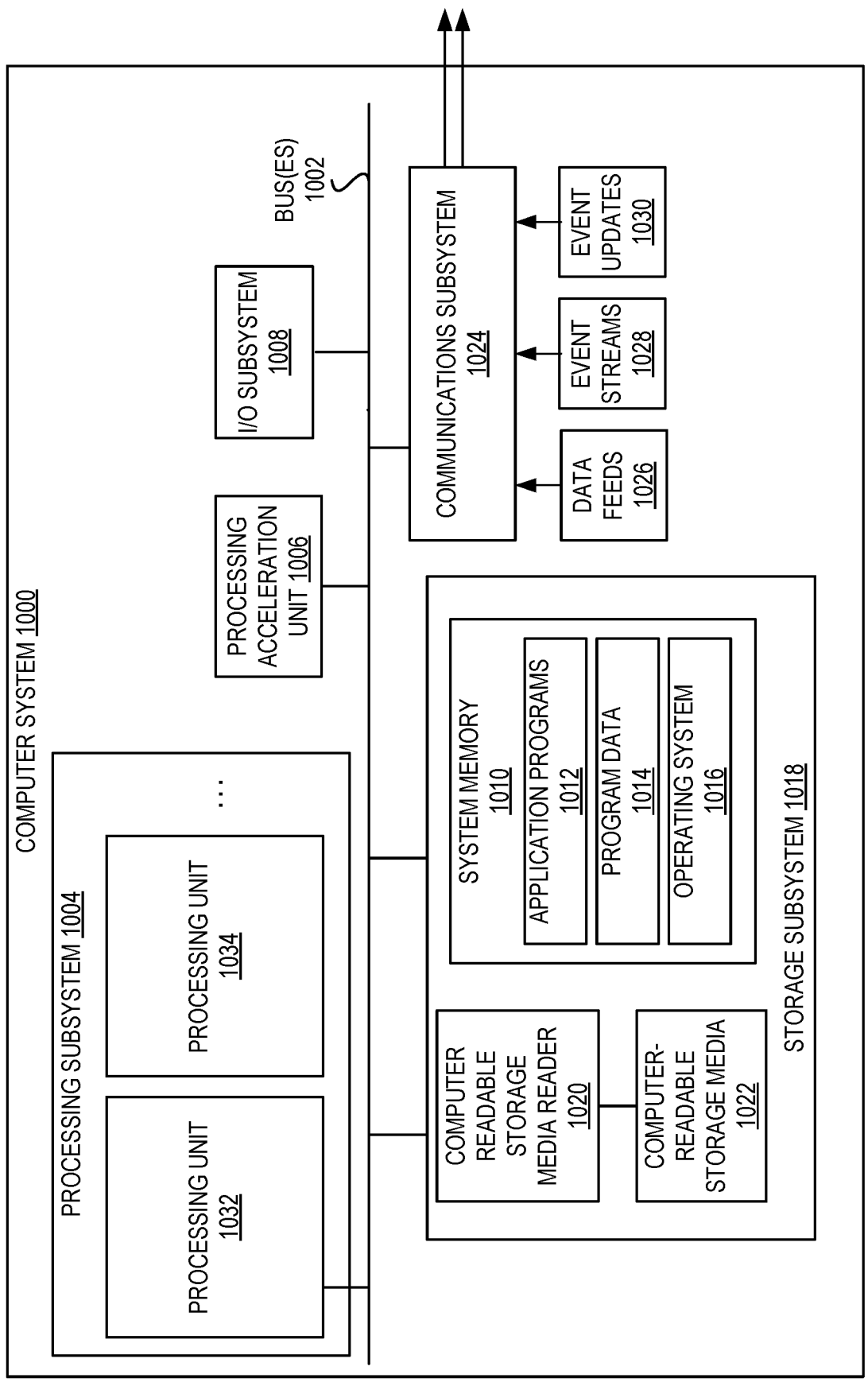
FIG. 10 illustrates an example of a computer system that may be used to implement various examples.

FIG. 10 illustrates an example of a computer system 1000 that may be used to implement the various examples discussed above. In some examples, the computer system 1000 may be used to implement any of the various servers and computer systems described above. As shown in FIG. 10, the computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018 and a communications subsystem 1024. The storage subsystem 1018 may include non-transitory computer-readable storage media 1022 and a system memory 1010.

The bus subsystem 1002 provides a mechanism for letting the various components and subsystems of the computer system 1000 communicate with each other as intended. Although the bus subsystem 1002 is shown schematically as a single bus, alternate examples of the bus subsystem may utilize multiple buses. The bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

The processing subsystem 1004 controls the operation of the computer system 1000 and may comprise one or more processors, application specific integrated circuits (ASICs), or field programmable gate arrays (FPGAs). The processors may include be single core or multi-core processors. The processing resources of computer system 700 can be organized into one or more processing units 1032, 1034. A processing unit may include one or more processors, including single core or multi-core processors, one or more cores from the same or different processors, a combination of cores and processors, or other combinations of cores and processors. In some examples, the processing subsystem 1004 can include one or more special purpose co-processors such as graphics processors, digital signal processors (DSPs), or the like. In some examples, some or all of the processing units of the processing subsystem 1004 can be implemented using customized circuits, such as application specific integrated circuits (ASICs), or field programmable gate arrays (FPGAs).

In some examples, the processing units in the processing subsystem 1004 can execute instructions stored in the system memory 1010 or on the computer readable storage media 1022. In various examples, the processing units can execute a variety of programs or code instructions and can maintain multiple concurrently executing programs or processes. At any given time, some or all of the program code to be executed can be resident in the system memory 1010 and/or on the computer-readable storage media 1022 including potentially on one or more storage devices. Through suitable programming, the processing subsystem 1004 can provide various functionalities described above. In instances where computer system 700 is executing one or more virtual machines, one or more processing units may be allocated to each virtual machine In some examples, a processing acceleration unit 1006 may be provided for performing customized processing or for off-loading some of the processing performed by the processing subsystem 1004 so as to accelerate the overall processing performed by the computer system 1000.

The I/O subsystem 1008 may include devices and mechanisms for inputting information to the computer system 1000 and/or for outputting information from or via the computer system 1000. In general, use of the term "input device" is intended to include all possible types of devices and mechanisms for inputting information to the computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 1018 provides a repository or data store for storing information that is used by the computer system 1000. The storage subsystem 1018 provides a tangible non-transitory computer-readable storage medium for storing the basic programming and data constructs that provide the functionality of some examples. Software (e.g., programs, code modules, instructions) that when executed by the processing subsystem 1004 provide the functionality described above may be stored in the storage subsystem 1018. The software may be executed by one or more processing units of the processing subsystem 1004. The storage subsystem 1018 may also provide a repository for storing data used in accordance with the present disclosure.

The storage subsystem 1018 may include one or more non-transitory memory devices, including volatile and non-volatile memory devices. As shown in FIG. 10, the storage subsystem 1018 includes a system memory 1010 and a computer-readable storage media 1022. The system memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 1000, such as during start-up, may typically be stored in the ROM. The RAM typically contains data and/or program modules that are presently being operated and executed by the processing subsystem 1004. In some implementations, the system memory 1010 may include multiple different types of memory, such as static random access memory (SRAM) or dynamic random access memory (DRAM), and the like.

By way of example, and not limitation, as depicted in FIG. 10, the system memory 1010 may load application programs 1012 that are being executed, which may include client applications, Web browsers, mid-tier applications, relational database management systems (RDBMS), etc., program data 1023, and an operating system 1016. By way of example, the operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

The computer-readable storage media 1022 may store programming and data constructs that provide the functionality of some examples. The computer-readable media 1022 may provide storage of computer-readable instructions, data structures, program modules, and other data for the computer system 1000. Software (programs, code modules, instructions) that when executed by the processing subsystem 1004 provides the functionality described above that may be stored in the storage subsystem 1018. By way of example, the computer-readable storage media 1022 may include non-volatile memory such as a hard disk drive, a magnetic disk drive, an optical disk drive such as a CD ROM, DVD, a Blu-Ray® disk, or other optical media. The computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The computer-readable storage media 1022 may provide storage of computer-readable instructions, data structures, program modules, and other data for the computer system 1000.

In some examples, the storage subsystem 1018 may also include a computer-readable storage media reader 1020 that can further be connected to the computer-readable storage media 1022. The reader 1020 may receive and be configured to read data from a memory device such as a disk, a flash driver, etc.

In some examples, the computer system 1000 may support virtualization technologies, including but not limited to virtualization of processing and memory resources. For example, the computer system 1000 may provide support for executing one or more virtual machines. The computer system 1000 may execute a program such as a hypervisor that facilitates the configuring and managing of the virtual machines. Each virtual machine generally runs independently of the other virtual machines. A virtual machine may be allocated memory, compute (e.g., processors, cores), I/O, and networking resources. Each virtual machine typically runs its own operating system, which may be the same as or different from the operating systems executed by other virtual machines executed by the computer system 1000. Accordingly, multiple operating systems may potentially be run concurrently by the computer system 1000.

The communications subsystem 1024 provides an interface to other computer systems and networks. The communications subsystem 1024 serves as an interface for receiving data from and transmitting data to other systems from the computer system 1000. For example, the communications subsystem 1024 may enable the computer system 1000 to establish a communication channel to one or more client computing devices via the Internet for receiving and sending information from and to the client computing devices.

The communication subsystem 1024 may support both wired and/or wireless communication protocols. For example, in some examples, the communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples, the communications subsystem 1024 can provide wired network connectivity (e.g., Ethernet) in addition to or instead of a wireless interface.

The communication subsystem 1024 can receive and transmit data in various forms. For example, in some examples, the communications subsystem 1024 may receive input communication in the form of structured and/or unstructured data feeds 1026, event streams 1028, event updates 1030, and the like. For example, the communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In some examples, the communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

The communications subsystem 1024 may also be configured to output the structured and/or unstructured data feeds 1026, event streams 1028, event updates 1030, and the like to one or more databases that may be in communication with one or more streaming data source computers coupled to the computer system 1000.

The computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of the computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various examples.

Although specific implementations have been described, various modifications, alterations, alternative constructions, and equivalents are possible. Implementations described in the present disclosure are not restricted to operation within certain specific data processing environments, but are free to operate within a plurality of data processing environments. Additionally, although implementations have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described implementations may be used individually or jointly.

Further, while implementations described in the present disclosure have been described using a particular combination of hardware and software, it should be recognized that other combinations of hardware and software are also possible. Some implementations described herein may be implemented only in hardware, or only in software, or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation, such as by executing computer instructions or code, or processors or cores programmed to execute code or instructions stored on a non-transitory memory medium, or any combination thereof. Processes can communicate using a variety of techniques including, but not limited to, conventional techniques for inter-process communication, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific implementations have been described, these are not intended to be limiting. Various modifications and equivalents are within the scope of the following claims.

What is claimed is:

1. A method for detecting usage anomalies in a multi-tenant cloud environment, the method comprising:
   obtaining activity data from a service provider system, wherein the activity data describes actions performed during use of a cloud service, wherein the actions are performed by one or more users associated with a tenant, wherein the service provider system provides the tenant with a tenant account, and wherein the tenant account enables the one or more users to access the cloud service; and
   generating, using the actions, a directed graph, wherein each node in the directed graph represents an action performed by the one or more users, and wherein each connection between two nodes represents a sequence in performance of actions represented by the two nodes.

2. The method of claim 1, further comprising:
   determining that an event in the activity data conflicts with a security control associated with the cloud service;
   determining that the event corresponds an event captured in the directed graph; and
   generating a recommendation that the security control be modified.

3. The method of claim 1, further comprising:
   determining that an event in the activity data violates a security policy;
   determining that the event corresponds to an event captured in the directed graph; and
   generating a recommendation to modify the security policy.

4. The method of claim 1, further comprising:
   obtaining additional activity data from the service provider system;
   mapping actions performed by a particular user to the directed graph;
   determining, from the mapping, that the particular user performed actions that do not correspond to the graph; and
   generating an alert that an anomaly has been detected.

5. The method of claim 1, wherein weights assigned to each node indicate a number of times the corresponding actions represented by the nodes were performed.

6. The method of claim 1, wherein a weight assigned to each connection between two nodes indicates a number of times a first action represented by a first node from the two nodes preceded a second action represented by a second node from the two nodes.

7. The method of claim 1, wherein each node is associated with a set of contextual parameters that are associated with the action represented by the node.

8. The method of claim 1, further comprising:
receiving input including a request to register the cloud service with a security management system.

9. The method of claim 8, further comprising:
configuring a pre-determined set of security controls for the cloud service.

10. The method of claim 9, further comprising:
using the directed graph to adjust the set of security controls.

11. The method of claim 8, further comprising:
configuring a pre-determined set of security policies for the tenant.

12. The method of claim 11, further comprising:
using the directed graph to adjust the set of security policies.

13. A system comprising:
one or more processors; and
one or more memory devices comprising instructions that, when executed by the one or more processors, cause the one or more processors to perform operations comprising:
obtaining activity data from a service provider system, wherein the activity data describes actions performed during use of a cloud service, wherein the actions are performed by one or more users associated with a tenant, wherein the service provider system provides the tenant with a tenant account, and wherein the tenant account enables the one or more users to access the cloud service; and
generating, using the actions, a directed graph, wherein each node in the directed graph represents an action performed by the one or more users, and wherein each connection between two nodes represents a sequence in performance of actions represented by the two nodes.

14. The system of claim 13, wherein weights assigned to each node indicate a number of times the corresponding actions represented by the nodes were performed.

15. The system of claim 13, wherein a weight assigned to each connection between two nodes indicates a number of times a first action represented by a first node from the two nodes preceded a second action represented by a second node from the two nodes.

16. The system of claim 13, wherein each node is associated with a set of contextual parameters that are associated with the action represented by the node.

17. A non-transitory computer-readable medium comprising instructions that, when executed by one or more processors, cause the one or more processors to perform operations comprising:
obtaining activity data from a service provider system, wherein the activity data describes actions performed during use of a cloud service, wherein the actions are performed by one or more users associated with a tenant, wherein the service provider system provides the tenant with a tenant account, and wherein the tenant account enables the one or more users to access the cloud service; and
generating, using the actions, a directed graph, wherein each node in the directed graph represents an action performed by the one or more users, and wherein each connection between two nodes represents a sequence in performance of actions represented by the two nodes.

18. The non-transitory computer-readable medium of claim 17, wherein weights assigned to each node indicate a number of times the corresponding actions represented by the nodes were performed.

19. The non-transitory computer-readable medium of claim 17, wherein a weight assigned to each connection between two nodes indicates a number of times a first action represented by a first node from the two nodes preceded a second action represented by a second node from the two nodes.

20. The non-transitory computer-readable medium of claim 17, wherein each node is associated with a set of contextual parameters that are associated with the action represented by the node.

* * * * *

UNITED STATES PATENT AND TRADEMARK OFFICE
CERTIFICATE OF CORRECTION

PATENT NO. : 12,160,449 B2
APPLICATION NO. : 17/675781
DATED : December 3, 2024
INVENTOR(S) : Biswas et al.

It is certified that error appears in the above-identified patent and that said Letters Patent is hereby corrected as shown below:

On the Title Page

On page 2, Column 2, under Item (56) Other Publications, Line 13, delete "Seclogmon:" and insert -- Seclogon: --.

On page 2, Column 2, under Item (56) Other Publications, Line 23, delete "Allow ance" and insert -- Allowance --.

In the Specification

In Column 9, Line 43, after "the" delete "a".

In Column 15, Line 38, delete ""created by":" and insert -- "created_by": --, therefor.

In Column 15, Line 42, delete ""created at":" and insert -- "created_at": --, therefor.

In Column 15, Line 43, delete ""event id":" and insert -- "event_id": --, therefor.

In Column 15, Line 44, delete ""event type":" and insert -- "event_type": --, therefor.

In Column 15, Line 45, delete ""ip address":" and insert -- "ip_address": --, therefor.

In Column 15, Line 47, delete ""session id":" and insert -- "session_id": --, therefor.

In Column 15, Line 48, delete ""additional details":" and insert -- "additional_details": --, therefor.

In Column 15, Line 62, delete ""item name": "financia12017Ql.doc"," and insert -- "item_ name": "financial2017Q1.doc", --, therefor.

Signed and Sealed this
First Day of April, 2025

Coke Morgan Stewart
*Acting Director of the United States Patent and Trademark Office*

CERTIFICATE OF CORRECTION (continued)
U.S. Pat. No. 12,160,449 B2

In Column 15, Line 63, delete ""item type":" and insert -- "item_type": --, therefor.

In Column 15, Line 64, delete ""item id":" and insert -- "item_id": --, therefor.

In Column 15, Line 66, delete ""additional details":" and insert -- "additional_details": --, therefor.

In Column 15, Line 67, delete ""service name":" and insert -- "service_ name": --, therefor.

In Column 16, Line 4, delete ""event type":" and insert -- "event_type": --, therefor.

In Column 16, Line 5, delete ""ip address":" and insert -- "ip_address": --, therefor.

In Column 16, Line 6, delete ""event id":" and insert -- "event_id": --, therefor.

In Column 16, Line 7, delete ""created at":" and insert -- "created_at": --, therefor.

In Column 16, Line 8, delete ""created by":" and insert -- "created_by": --, therefor.

In Column 16, Line 24, delete ""am":" and insert -- "arn": --, therefor.

In Column 16, Line 32, delete ""H"," and insert -- "[]", --, therefor.

In Column 16, Line 48, delete "-" and insert -- . --, therefor.

In Column 35, Line 56, delete "ounts" and insert -- counts --, therefor.

In Column 35, Line 60, delete "ounts" and insert -- counts --, therefor.

In Column 35, Line 64, delete "ounts" and insert -- counts --, therefor.

In Column 40, Line 13, delete "can to" and insert -- can --, therefor.

In Column 45, Line 5, delete "We" and insert -- $W_e$ --, therefor.

In Column 45, Line 8, delete "We" and insert -- $W_e$ --, therefor.

In Column 53, Line 10, delete "in in" and insert -- in --, therefor.